(12) United States Patent
Du

(10) Patent No.: US 12,202,486 B2
(45) Date of Patent: Jan. 21, 2025

(54) METHOD, APPARATUS, AND DEVICE FOR CONSTRUCTING SIMULATED VEHICLE LANE CHANGE TRAJECTORY, AND STORAGE MEDIUM

(71) Applicant: Tencent Technology (Shenzhen) Company Limited, Shenzhen (CN)

(72) Inventor: Haining Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 613 days.

(21) Appl. No.: 17/527,700

(22) Filed: Nov. 16, 2021

(65) Prior Publication Data

US 2022/0073076 A1 Mar. 10, 2022

Related U.S. Application Data

(63) Continuation of application No. PCT/CN2020/113135, filed on Sep. 3, 2020.

(30) Foreign Application Priority Data

Sep. 9, 2019 (CN) .......................... 201910857583.2

(51) Int. Cl.
*B60W 30/18* (2012.01)
*B60W 30/08* (2012.01)
(Continued)

(52) U.S. Cl.
CPC .... *B60W 30/18163* (2013.01); *B60W 30/143* (2013.01); *B60W 30/16* (2013.01);
(Continued)

(58) Field of Classification Search
CPC ......... B60W 30/18163; B60W 30/143; B60W 30/16; B60W 40/04; B60W 40/105;
(Continued)

(56) References Cited

U.S. PATENT DOCUMENTS

2015/0251656 A1* 9/2015 Yester ................... B60W 30/09
 701/41
2015/0360684 A1* 12/2015 Matsuno ......... B60W 30/18163
 701/23
(Continued)

FOREIGN PATENT DOCUMENTS

| CN | 104282033 A | 1/2015 |
|---|---|---|
| CN | 104960524 A | 10/2015 |

(Continued)

OTHER PUBLICATIONS

Extended European Search Report for European Patent Application No. 20862295.1 dated Sep. 28, 2022, 9 pages.
(Continued)

*Primary Examiner* — Mohamed Abdo Algehaim
(74) *Attorney, Agent, or Firm* — Crowell & Moring LLP

(57) ABSTRACT

This application discloses a method, an apparatus, and a storage medium for constructing a simulated vehicle lane change trajectory and control a vehicle based on it. One method includes: determining a target preceding vehicle according to a position of a lane change vehicle; determining target longitudinal traveling data; determining at least one lane change trajectory in a determination of at least one of following conditions: whether lane change condition is met; whether it is determined to continue to change lanes; and controlling the lance change vehicle based on the at least one lane change trajectory.

20 Claims, 12 Drawing Sheets

(51) Int. Cl.
*B60W 30/14* (2006.01)
*B60W 30/16* (2020.01)
*B60W 40/04* (2006.01)
*B60W 40/105* (2012.01)

(52) U.S. Cl.
CPC .......... *B60W 40/04* (2013.01); *B60W 40/105* (2013.01); *B60W 2030/082* (2013.01); *B60W 2554/4042* (2020.02); *B60W 2554/802* (2020.02)

(58) Field of Classification Search
CPC ... B60W 2030/082; B60W 2554/4042; B60W 2554/802; B60W 30/09; B60W 30/0956; B62D 15/0255; G05B 17/02
USPC .......................................................... 701/96
See application file for complete search history.

(56) References Cited

U.S. PATENT DOCUMENTS

| | | | | |
|---|---|---|---|---|
| 2017/0259819 | A1* | 9/2017 | Takeda | B60W 30/18163 |
| 2017/0291602 | A1* | 10/2017 | Newman | B60W 30/095 |
| 2018/0033309 | A1* | 2/2018 | Norwood | B62D 15/029 |
| 2018/0043890 | A1* | 2/2018 | Keller | B60W 30/08 |
| 2018/0201272 | A1* | 7/2018 | Takeda | B60W 10/20 |
| 2018/0253975 | A1* | 9/2018 | Mizutani | G08G 1/167 |
| 2018/0354519 | A1* | 12/2018 | Miyata | B60W 30/18163 |
| 2019/0016339 | A1* | 1/2019 | Ishioka | B60W 30/0956 |
| 2019/0185005 | A1* | 6/2019 | Fukuda | B60W 40/04 |
| 2019/0278280 | A1* | 9/2019 | Imai | B60W 30/09 |
| 2019/0315358 | A1* | 10/2019 | Kim | B60W 50/082 |
| 2020/0047752 | A1* | 2/2020 | Ivanovic | B60W 40/072 |
| 2020/0055515 | A1* | 2/2020 | Herman | G06V 20/58 |
| 2020/0180634 | A1* | 6/2020 | Hammoud | G08G 1/163 |
| 2020/0231159 | A1* | 7/2020 | Tsuji | G08G 1/167 |
| 2020/0307589 | A1* | 10/2020 | Li | B60W 60/0023 |
| 2020/0307598 | A1* | 10/2020 | Kumano | B60W 30/162 |
| 2020/0342761 | A1* | 10/2020 | Hosokawa | G06V 20/588 |
| 2020/0384993 | A1* | 12/2020 | El Haj Shhade | B60W 30/12 |
| 2021/0061282 | A1* | 3/2021 | Jafari Tafti | G05D 1/0088 |
| 2021/0074162 | A1* | 3/2021 | Jafari Tafti | B60W 30/095 |
| 2022/0266858 | A1* | 8/2022 | Taniguchi | B62D 15/0255 |
| 2022/0343760 | A1* | 10/2022 | Baek | H04W 4/46 |
| 2022/0363254 | A1* | 11/2022 | Baek | B60W 50/14 |
| 2023/0009173 | A1* | 1/2023 | Reshef | B60W 30/18163 |

FOREIGN PATENT DOCUMENTS

| | | |
|---|---|---|
| CN | 109035862 A | 12/2018 |
| CN | 109035863 A | 12/2018 |
| CN | 109948801 A | 6/2019 |
| CN | 110780602 A | 2/2020 |
| DE | 102013021813 A1 | 6/2015 |
| EP | 1898232 A1 | 3/2008 |

OTHER PUBLICATIONS

International Search Report and Written Opinion with English Translation of International Patent Application No. PCT/CN2020/113135 dated Nov. 25, 2020; 12 pages.

\* cited by examiner

METHOD, APPARATUS, AND DEVICE FOR CONSTRUCTING SIMULATED VEHICLE LANE CHANGE TRAJECTORY, AND STORAGE MEDIUM

RELATED APPLICATION

This application is a continuation application of the International PCT Application No. PCT/CN2020/113135, filed with the China National Intellectual Property Administration, PRC on Sep. 3, 2020 which claims priority to Chinese Patent Application No. 201910857583.2, filed with the China National Intellectual Property Administration, PRC on Sep. 9, 2019, each of which is incorporated herein by reference in its entirety.

FIELD OF THE TECHNOLOGY

This application relates to the field of Internet communication technologies, and in particular, to a method, an apparatus, and a device for constructing a simulated vehicle lane change trajectory.

BACKGROUND OF THE DISCLOSURE

In development of automated driving systems, a simulation process may be required, and a simulation experiment based on an automated driving simulation system, as a zero-risk, fast iterative, and reproducible test method, lays a solid foundation for automated driving on roads.

At present, in a vehicle lane change scenario in an automated driving simulation system, only trajectory planning of a vehicle traveling from a point in its own lane to another point in a neighboring lane within a specified time is considered, in other words, a behavior of a vehicle changing from an original lane to a target lane is simulated. However, in the real world, when traffic is relatively heavy or drivers are fractious, it is likely that a vehicle lane change process cannot be completed due to interference of some factors. For example, a vehicle that is in a neighboring lane and is behind the present vehicle may accelerate instead of yielding, and consequently, a safe distance of the present vehicle in the lane may not ensure smooth completion of a lane change behavior.

SUMMARY

Embodiments of this disclosure provide a method for constructing a simulated vehicle lane change trajectory, the method being executed by a target lane change vehicle, and including:
  constructing a lane change trajectory coordinate system by using a position of the target lane change vehicle as an origin, a center line of a current lane of the target lane change vehicle along a traveling direction as an ordinate axis, and a normal direction of the center line as an abscissa axis direction, the method including:
  determining a target preceding vehicle according to the position of the target lane change vehicle;
  determining target longitudinal traveling data of the target lane change vehicle in a lane change process according to a longitudinal speed of the target lane change vehicle, a longitudinal speed of the target preceding vehicle, and a distance between the target preceding vehicle and the target lane change vehicle at each moment in the lane change process;
  determining target transverse traveling data of the target lane change vehicle in the lane change process according to preset initial transverse traveling data, preset end transverse traveling data, and a preset lane change time in the lane change process;
  constructing, when a preset lane change condition is met, or when the preset lane change condition is not met, but it is determined to continue to change lanes, a first lane change trajectory of the target lane change vehicle in the lane change trajectory coordinate system based on the target transverse traveling data and the target longitudinal traveling data when a following vehicle in a target lane decelerates;
  updating, when the preset lane change condition is not met, but it is determined to continue to change lanes, an acceleration in the target longitudinal traveling data when the following vehicle does not decelerate, to cause an updated longitudinal speed to be greater than a longitudinal speed of the following vehicle and less than a longitudinal speed of a preceding vehicle in the target lane, and constructing a second lane change trajectory of the target lane change vehicle in the lane change trajectory coordinate system based on the updated longitudinal traveling data and the target transverse traveling data; and
  updating, when the preset lane change condition is not met, and it is determined not to continue to change lanes, transverse traveling data and longitudinal traveling data in an original lane return process, and constructing a first original lane return trajectory of the target lane change vehicle in the lane change trajectory coordinate system according to the transverse traveling data and the longitudinal traveling data in the original lane return process.

The embodiments of this application further provide an apparatus for constructing a simulated vehicle lane change trajectory, including:
  a lane change trajectory coordinate system construction module, configured to construct a lane change trajectory coordinate system by using a position of a target lane change vehicle as an origin, a center line of a current lane of the target lane change vehicle along a traveling direction as an ordinate axis, and a normal direction of the center line as an abscissa axis direction;
  a target preceding vehicle determining module, configured to determine a target preceding vehicle according to the position of the target lane change vehicle;
  a target longitudinal traveling data determining module, configured to determine target longitudinal traveling data of the target lane change vehicle in a lane change process according to a longitudinal speed of the target lane change vehicle, a longitudinal speed of the target preceding vehicle, and a distance between the target preceding vehicle and the target lane change vehicle at each moment in the lane change process;
  a target transverse traveling data determining module, configured to determine target transverse traveling data of the target lane change vehicle in the lane change process according to preset initial transverse traveling data, preset end transverse traveling data, and a preset lane change time in the lane change process;
  a first lane change trajectory construction module, configured to construct, when a preset lane change condition is met, or when the preset lane change condition is not met, but it is determined to continue to change lanes, a first lane change trajectory of the target lane change vehicle in the lane change trajectory coordinate system based on the target transverse traveling data and the target longitudinal traveling data when a following vehicle in a target lane decelerates;

a second lane change trajectory construction module, configured to update, when the preset lane change condition is not met, but it is determined to continue to change lanes, an acceleration in the target longitudinal traveling data when the following vehicle does not decelerate, to cause an updated longitudinal speed to be greater than a longitudinal speed of the following vehicle and less than a longitudinal speed of a preceding vehicle in the target lane, and construct a second lane change trajectory of the target lane change vehicle in the lane change trajectory coordinate system based on the updated longitudinal traveling data and the target transverse traveling data; and a first original lane return trajectory construction module, configured to update, when the preset lane change condition is not met, and it is determined not to continue to change lanes, transverse traveling data and longitudinal traveling data in an original lane return process, and construct a first original lane return trajectory of the target lane change vehicle in the lane change trajectory coordinate system according to the transverse traveling data and the longitudinal traveling data in the original lane return process.

In some embodiments, the target preceding vehicle determining module is further configured to determine the target preceding vehicle from the preceding vehicle in the target lane and a preceding vehicle in the current lane depending on whether a center of mass of the target lane change vehicle crosses a lane line of the current lane.

In some embodiments, the first original lane return trajectory construction module is further configured to use a moment at which the preset lane change condition is not met as an initial moment of returning to an original lane, and determine transverse traveling data at the initial moment; determine transverse traveling data at an end moment of the returning to an original lane; determine the transverse traveling data in the original lane return process according to the transverse traveling data at the initial moment, the transverse traveling data at the end moment, and a first preset return time; update, in the preceding vehicle in the target lane and the preceding vehicle in the current lane, a target preceding vehicle within from the initial moment to the end moment in real time depending on whether the center of mass of the target lane change vehicle crosses the lane line of the current lane within from the initial moment to the end moment; and determine the longitudinal traveling data in the original lane return process according to a longitudinal speed of the target lane change vehicle, a longitudinal speed of the target preceding vehicle, and a distance between the target preceding vehicle and the target lane change vehicle within from the initial moment to the end moment.

In some embodiments, the apparatus further includes: a first initial moment determining module, configured to use the moment at which the preset lane change condition is not met as an initial moment of straightening a vehicle front; a first transverse traveling data determining module, configured to determine transverse traveling data at the initial moment; a second transverse traveling data determining module, configured to determine transverse traveling data at an end moment of the straightening a vehicle front; a first transverse traveling data update module, configured to determine, according to the transverse traveling data at the initial moment, the transverse traveling data at the end moment, and a preset straightening time, transverse traveling data in a process of the straightening a vehicle front; a second target preceding vehicle update module, configured to update, in the preceding vehicle in the target lane and the preceding vehicle in the current lane, a target preceding vehicle within from the initial moment to the end moment in real time depending on whether the center of mass of the target lane change vehicle crosses the lane line of the current lane within from the initial moment to the end moment; a first longitudinal traveling data update module, configured to determine, according to a longitudinal speed of the target lane change vehicle, a longitudinal speed of the target preceding vehicle, and a distance between the target preceding vehicle and the target lane change vehicle within from the initial moment to the end moment, longitudinal traveling data in the process of the straightening a vehicle front; and a vehicle front straightening trajectory construction module, configured to construct a vehicle front straightening trajectory of the target lane change vehicle in the lane change trajectory coordinate system based on the transverse traveling data and the longitudinal traveling data in the process of the straightening a vehicle front.

In some embodiments, the apparatus further includes: a straight-line riding process determining module, configured to use a process in which the target lane change vehicle continues traveling longitudinally from a transverse position in the transverse traveling data at the end moment of the straightening a vehicle front as a straight-line riding process; a second initial moment determining module, configured to use a moment at which the following vehicle decelerates in the straight-line riding process as an initial moment of continuing to change lanes; a third transverse traveling data determining module, configured to determine transverse traveling data at the initial moment of the continuing to change lanes; a fourth transverse traveling data determining module, configured to determine transverse traveling data at an end moment of the continuing to change lanes; a second transverse traveling data update module, configured to determine, according to the transverse traveling data at the initial moment, the transverse traveling data at the end moment, and a preset time of the continuing to change lanes, transverse traveling data in a process of the continuing to change lanes; a second target preceding vehicle update module, configured to update, in the preceding vehicle in the target lane and the preceding vehicle in the current lane, a target preceding vehicle within from the initial moment of the continuing to change lanes to the end moment of the continuing to change lanes in real time depending on whether the center of mass of the target lane change vehicle crosses the lane line of the current lane within from the initial moment of the continuing to change lanes to the end moment of the continuing to change lanes; a second longitudinal traveling data update module, configured to determine longitudinal traveling data in the process of the continuing to change lanes according to a longitudinal speed of the target lane change vehicle, a longitudinal speed of the target preceding vehicle, and a distance between the target preceding vehicle and the target lane change vehicle within from the initial moment of the continuing to change lanes to the end moment of the continuing to change lanes; and a third lane change trajectory construction module, configured to construct a third lane change trajectory of the target lane change vehicle in the lane change trajectory coordinate system based on the transverse traveling data and the longitudinal traveling data in the process of the continuing to change lanes.

In some embodiments, the apparatus further includes: a third initial moment determining module, configured to use, when a duration in the straight-line riding process is greater than or equal to a preset riding time, and the following vehicle does not decelerate, a moment after riding for the preset riding time as an initial moment of returning to an original lane; a fifth transverse traveling data determining module, configured to determine transverse traveling data at the initial moment of the returning to an original lane; a sixth transverse traveling data determining module, configured to determine transverse traveling data at an end moment of the returning to an original lane; a third transverse traveling data update module, configured to determine transverse traveling data in an original lane return process according to the transverse traveling data at the initial moment of the returning to an original lane, the transverse traveling data at the end moment of the returning to an original lane, and a preset straightening time; a third target preceding vehicle update module, configured to update, in the preceding vehicle in the target lane and the preceding vehicle in the current lane, a target preceding vehicle within from the initial moment to the end moment of the returning to an original lane in real time depending on whether the center of mass of the target lane change vehicle crosses the lane line of the current lane within from the initial moment to the end moment of the returning to an original lane; a third longitudinal traveling data update module, configured to determine, according to a longitudinal speed of the target lane change vehicle, a longitudinal speed of the target preceding vehicle, and a distance between the target preceding vehicle and the target lane change vehicle within from the initial moment to the end moment of the returning to an original lane, the longitudinal traveling data in the original lane return process; and a second original lane return trajectory construction module, configured to construct a second original lane return trajectory of the target lane change vehicle in the lane change trajectory coordinate system based on the transverse traveling data and the longitudinal traveling data in the original lane return process.

In some embodiments, the apparatus further includes: a riding time determining module, configured to determine a riding time of continuing traveling longitudinally from a transverse position in the transverse traveling data at the end moment of the straightening a vehicle front; and a riding trajectory construction module, configured to construct a riding trajectory of the target lane change vehicle in the lane change trajectory coordinate system based on the riding time and the transverse traveling data and the longitudinal traveling data at the end moment of the straightening a vehicle front.

In some embodiments, the apparatus further includes: a lane change scenario proportion setting module, configured to set a proportion of lane change scenarios corresponding to the first lane change trajectory, the second lane change trajectory, the first original lane return trajectory, and the second original lane return trajectory; and a lane change scenario construction module, configured to construct a lane change scenario of the target lane change vehicle based on the lane change scenarios with the specified proportion.

In some embodiments, the apparatus further includes: a recording module, configured to record, when the preset lane change condition is not met, but it is determined to continue to change lanes, a collision accident when the following vehicle does not decelerate.

The embodiments of this application further provide a device for constructing a simulated vehicle lane change trajectory, including a processor and a memory, the memory storing at least one instruction, at least one program, a code set, or an instruction set, the at least one instruction, the at least one program, the code set, or the instruction set being loaded and executed by the processor to perform the method for constructing a simulated vehicle lane change trajectory according to the embodiments of this application.

The embodiments of this application further provide a non-transitory computer-readable storage medium, storing at least one instruction, at least one program, a code set, or an instruction set, the at least one instruction, the at least one program, the code set, or the instruction set being loaded and executed by a processor to perform the foregoing method for constructing a simulated vehicle lane change trajectory.

BRIEF DESCRIPTION OF THE DRAWINGS

To describe the technical solutions and advantages in the embodiments of this application more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

The following clearly and completely describes the technical solutions in embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

In the specification, claims, and the foregoing accompanying drawings of this application, the terms "first", "second", and so on are intended to distinguish similar objects but do not necessarily indicate a specific order or sequence. The data termed in such a way are interchangeable in proper circumstances, so that the embodiments of this application described herein can be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

In the related art, it is not taken into consideration that in the real world, when traffic is relatively heavy or drivers are fractious, it is likely that a vehicle lane change process may not be completed at a time due to interferences of some factors. Therefore, vehicle lane change scenarios in the related art may cause a problem that it is difficult for simulation results to reflect the reality, and cannot provide effective decision-making support for practical application of automatic driving.

Based on this, the embodiments of this application provide a method for constructing a simulated vehicle lane change trajectory, so that a simulated trajectory can reflect the reality better, and can provide effective decision-making support for practical application of automatic driving.

Figure 1A:
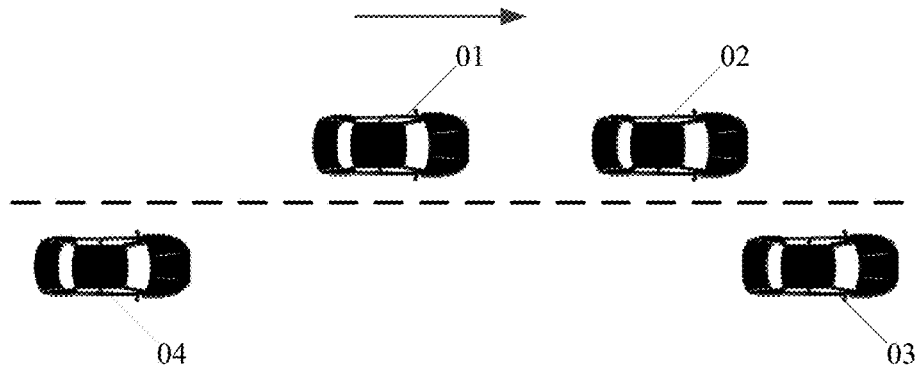
FIG. 1A is a schematic diagram of an exemplary application scenario according to an embodiment of this disclosure.

FIG. 1A is a schematic diagram of an application scenario to which a method for constructing a simulated vehicle lane change trajectory according to an embodiment of this disclosure is applicable. As shown in FIG. 1A, the application scenario includes at least a simulated vehicle 01, a simulated vehicle 02, a simulated vehicle 03, and a simulated vehicle 04.

Specifically, the simulated vehicle 01 may be a target lane change vehicle needing to change lanes in a vehicle driving simulation system. Simulated vehicle 01 is driving in a current lane (also referred to as initial lane, or original lane) and need to change to a target lane. Specifically, the simulated vehicle 02 may be a preceding vehicle that is located in the current lane of the target lane change vehicle and that is in front of the target lane change vehicle in the vehicle driving simulation system. The simulated vehicle 03 may be a preceding vehicle that is located in the target lane of the target lane change vehicle and that is in front of the target lane change vehicle in the vehicle driving simulation system. The simulated vehicle 04 may be a following vehicle that is located in the target lane of the target lane change vehicle and that is behind the target lane change vehicle in the vehicle driving simulation system.

Based on the foregoing application environment, the embodiments of this application provide the method for constructing a simulated vehicle lane change trajectory, executed by the target lane change vehicle, for example, the simulated vehicle 01. Before the simulated vehicle lane change trajectory is constructed, a lane change trajectory coordinate system is constructed by using a position of the target lane change vehicle as an origin, a center line of a current lane of the target lane change vehicle along a traveling direction as an ordinate axis, and a normal direction of the center line as an abscissa axis direction.

Figure 1B:
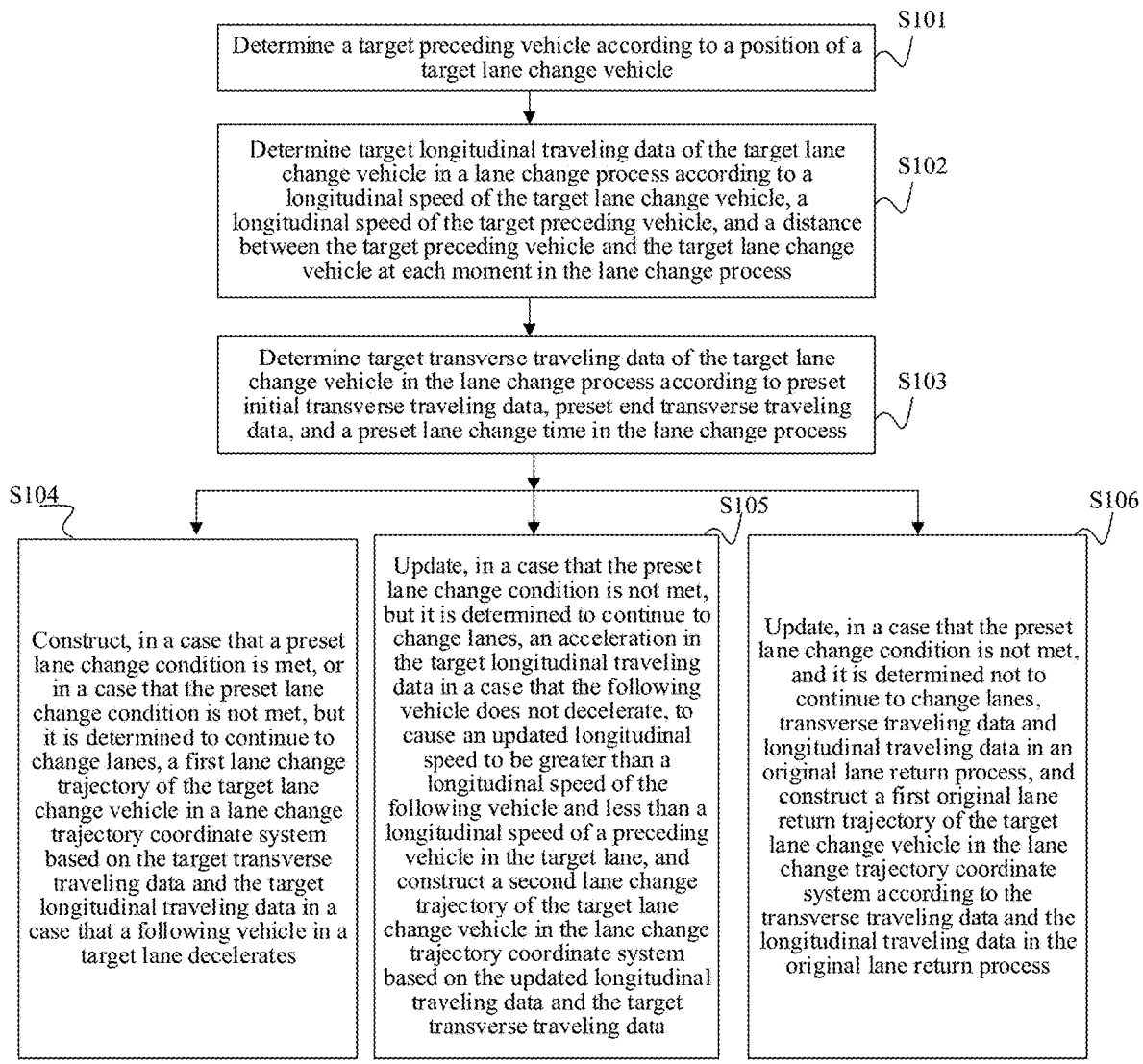
FIG. 1B is a schematic flowchart of a method for constructing a simulated vehicle lane change trajectory according to an embodiment of this disclosure.

FIG. 1B is a schematic flowchart of a method for constructing a simulated vehicle lane change trajectory according to an embodiment of this disclosure. As shown in FIG. 1B, the method for constructing a simulated vehicle lane change trajectory includes the following steps:

Step S101: Determine a target preceding vehicle according to a position of a target lane change vehicle.

In some embodiments, the position of the target lane change vehicle is reflected by a positional relationship between a center of mass of the target lane change vehicle and a lane line of a current lane (i.e., the lane line between the current lane and the target lane), and the target preceding vehicle is determined from a preceding vehicle in the target lane and a preceding vehicle in the current lane depending on whether the center of mass of the target lane change vehicle crosses the lane line of the current lane.

Step S102: Determine target longitudinal traveling data of the target lane change vehicle in a lane change process according to a longitudinal speed of the target lane change vehicle, a longitudinal speed of the target preceding vehicle, and a distance between the target preceding vehicle and the target lane change vehicle at each moment in the lane change process. The lane change process is a process to change from an initial lane (or current lane, original lane) to a target lane. In some embodiments, longitudinal traveling data may include a longitudinal position, a longitudinal speed (or velocity), and a longitudinal acceleration.

Step S103: Determine target transverse traveling data of the target lane change vehicle in the lane change process according to preset initial transverse traveling data, preset end transverse traveling data, and a preset lane change time in the lane change process. In some embodiments, transverse traveling data may include a transverse position, a transverse speed (or velocity), and a transverse acceleration, which may be denoted as $Qd_c$, $Vd_c$, and $Ad_c$, respectively. For each moment, the transverse traveling data may be denoted as $(Qd_c, Vd_c, Ad_c)$.

Step S104: Construct, when a preset lane change condition is met, or when the preset lane change condition is not met, but it is determined that the target lane change vehicle continues to change lanes, a first lane change trajectory of the target lane change vehicle in the lane change trajectory coordinate system based on the target transverse traveling data and the target longitudinal traveling data when a following vehicle in the target lane decelerates.

Step S105: Update, when the preset lane change condition is not met, but it is determined that the target lane change vehicle continues to change lanes, an acceleration in the target longitudinal traveling data when the following vehicle does not decelerate, to cause an updated longitudinal speed to be greater than a longitudinal speed of the following vehicle and less than a longitudinal speed of the preceding vehicle in the target lane, and construct a second lane change trajectory of the target lane change vehicle in the lane change trajectory coordinate system based on the updated longitudinal traveling data and the target transverse traveling data.

Step S106: Update, when the preset lane change condition is not met, and it is determined that the target lane change vehicle does not continue to change lanes, transverse traveling data and longitudinal traveling data in a lane return process to return to the original lane, and construct a first original lane return trajectory of the target lane change vehicle in the lane change trajectory coordinate system according to the transverse traveling data and the longitudinal traveling data in the original lane return process.

In some embodiments, the determining a target preceding vehicle according to a position of a target lane change vehicle includes: determining the target preceding vehicle from a preceding vehicle in the target lane and a preceding vehicle in the current lane depending on whether the center of mass of the target lane change vehicle crosses the lane line of the current lane. For example, if the target lane change vehicle crosses the lane line, then the preceding vehicle is the preceding vehicle in the target lane; otherwise if the target lane change vehicle does not cross the lane line, then the preceding vehicle is the preceding vehicle in the current lane.

In some embodiments, a proportion of lane change scenarios corresponding to the first lane change trajectory, the second lane change trajectory, the first lane return trajectory, and the second lane return trajectory is set; and a lane change scenario of the target lane change vehicle is constructed based on the lane change scenarios with the specified proportion.

In the method for constructing a simulated vehicle lane change trajectory provided in this application, a lane change trajectory coordinate system is constructed, then, a traveling status in a lane change process is represented by transverse traveling data and longitudinal traveling data respectively, for different statuses encountered in the lane change process, different lane change trajectories are constructed with reference to the transverse traveling data and the longitudinal traveling data, and an original lane return trajectory is constructed when a lane change cannot be completed at a time because a following vehicle located behind the present vehicle in the target lane accelerates instead of yielding. In this way, a simulated trajectory can reflect the reality better, and can provide effective decision-making support for practical application of automatic driving.

Figure 2:
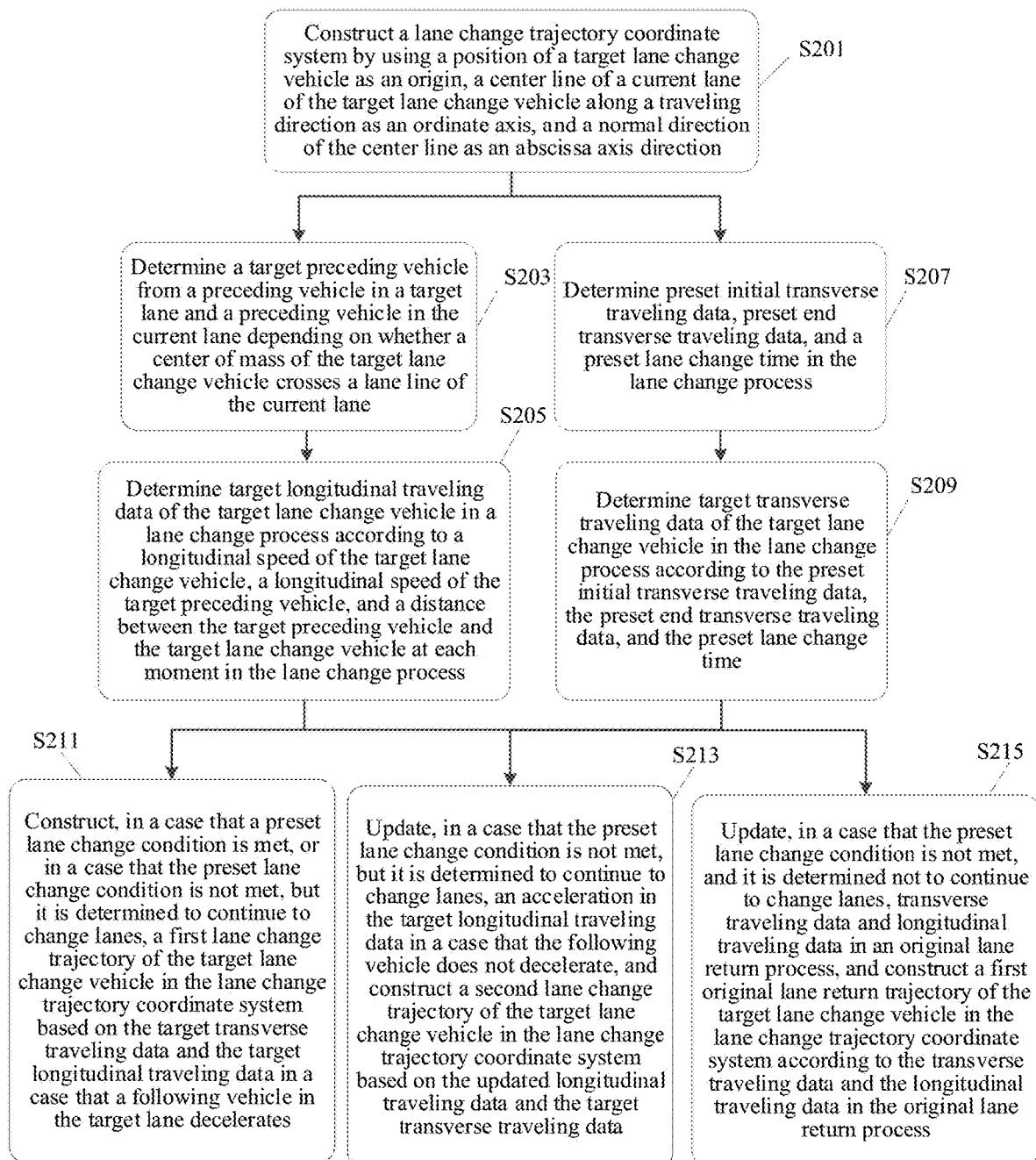
FIG. 2 is a schematic flowchart of a method for constructing a simulated vehicle lane change trajectory according to an embodiment of this disclosure.

The embodiments of this application further provide a method for constructing a simulated vehicle lane change trajectory. FIG. 2 is a schematic flowchart of a method for constructing a simulated vehicle lane change trajectory according to an embodiment of this disclosure. Although this disclosure provides operational steps of the method described in the embodiments or flowcharts, more or fewer operational steps may be included based on design consideration. The order of the steps listed in the embodiments is exemplary only and is merely one of a plurality of step execution orders, and does not indicate the only execution order. When the method is performed in an actual system or server product, the method may be performed according to method orders shown in the embodiments or the accompanying drawings or performed in parallel (for example, in a parallel processor or multi-thread processing environment). Specifically, as shown in FIG. 2, the method may include:

S201: Construct a lane change trajectory coordinate system by using a position of a target lane change vehicle as an origin, a center line of a current lane of the target lane change vehicle along a traveling direction as an ordinate axis, and a normal direction of the center line as an abscissa axis direction.

Figure 3:
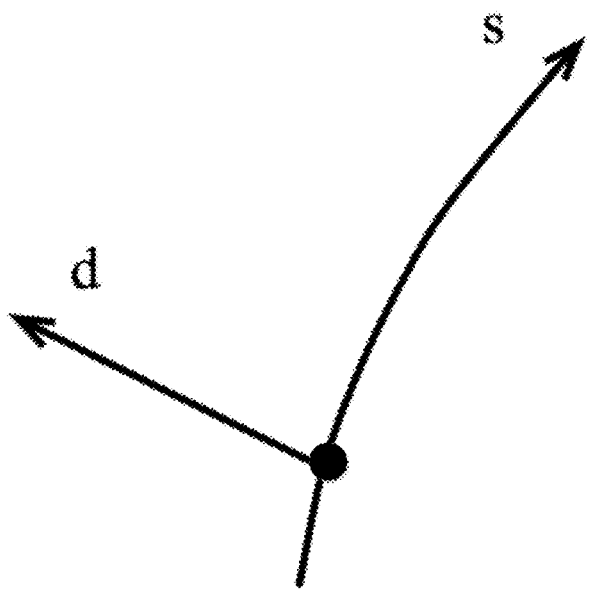
FIG. 3 is a schematic diagram of a lane change trajectory coordinate system according to an embodiment of this disclosure.

In some embodiments, as shown in FIG. 3, the lane change trajectory coordinate system is constructed by using the position of the target lane change vehicle as the origin, the center line of the lane along the traveling direction as the ordinate axis (a direction s), and the normal direction of the center line as the abscissa axis direction (a direction d). Correspondingly, when a trajectory is subsequently determined in the lane change trajectory coordinate system, descriptions are made by using a longitudinal distance (that is, a distance along the center line in the traveling direction) and a transverse distance (that is, an offset distance from the center line) with reference to the center line of the lane. Correspondingly, traveling data in a lane change process of the target lane change vehicle may be divided into transverse traveling data and longitudinal traveling data. Specifically, the transverse traveling data may include a transverse speed, a transverse acceleration, and a transverse position (that is, a transverse offset distance relative to the center line); and the longitudinal traveling data may include a longitudinal speed, a longitudinal acceleration, and a longitudinal position.

S203: Determine a target preceding vehicle from a preceding vehicle in a target lane and a preceding vehicle in the current lane depending on whether a center of mass of the target lane change vehicle crosses a lane line of the current lane.

In some embodiments, the target preceding vehicle may be a vehicle that affects the longitudinal traveling data of the target lane change vehicle during the lane change process.

In actual applications, when the center of mass of the target lane change vehicle crosses the lane line of the current lane, it may be considered that the target lane change vehicle has entered the target lane, and correspondingly, impact of a preceding vehicle in an original lane on the present vehicle may not be considered, and only impact of a speed, a distance, and the like of the preceding vehicle in the target lane on the target lane change vehicle is considered. Correspondingly, the preceding vehicle in the target lane may be used as the target preceding vehicle.

In actual applications, when the center of mass of the target lane change vehicle does not cross the lane line of the current lane, it may be considered that the target lane change vehicle is in an initial stage of a lane change, and the speed and the distance of the preceding vehicle in the target lane and a speed and a distance of the preceding vehicle in the current lane are considered together when a longitudinal speed of the target lane change vehicle is controlled. Correspondingly, a preceding vehicle having a shorter distance from the target lane change vehicle in the preceding vehicle in the target lane and the preceding vehicle in the current lane may be used as the target preceding vehicle.

S205: Determine target longitudinal traveling data of the target lane change vehicle in a lane change process according to a longitudinal speed of the target lane change vehicle, a longitudinal speed of the target preceding vehicle, and a distance between the target preceding vehicle and the target lane change vehicle at each moment in the lane change process.

In some embodiments, the distance between the target preceding vehicle and the target lane change vehicle may be a longitudinal distance between the target preceding vehicle and the target lane change vehicle.

In some embodiments, in a simulation system, each moment corresponds to a simulation step size, for example, the simulation step size may be 1s. Correspondingly, the each moment corresponds to each one second. In some embodiments, a time period of the lane change process may be preset. Correspondingly, in the lane change process, the target longitudinal traveling data of the target lane change vehicle may be determined based on the longitudinal speed of the target lane change vehicle, the longitudinal speed of the target preceding vehicle, and the distance between the target preceding vehicle and the target lane change vehicle at each moment in the lane change process. In some embodiments, the target longitudinal traveling data of the target lane change vehicle may be determined with reference to a car-following algorithm.

In some embodiments, a formula of the car-following algorithm is as follows:

$$\frac{dv}{dt} = a\left[1 - \left(\frac{v}{v_0}\right)^\delta - \left(\frac{s^*(v, \Delta v)}{s}\right)^2\right]$$

$$s^*(v, \Delta v) = s_0 + \max\left[0, \left(vT + \frac{v\Delta v}{2\sqrt{ab}}\right)\right]$$

where $s_0$ is a minimum safe distance between the target preceding vehicle and the target lane change vehicle; $v_0$ is a free flow speed, and is a constant; v is a speed of the target lane change vehicle at a previous moment (a previous simulation step size); s is the distance between the target preceding vehicle and the target lane change vehicle; T is a safe time interval; a is an acceleration of the target preceding vehicle at the previous moment; b is a comfortable deceleration, and is a constant; and $\Delta v$ is a speed difference between the target lane change vehicle and the target preceding vehicle at the previous moment.

In addition, it is to be understood that, if the lane change process is interrupted due to the safe distance, and the target lane change vehicle needs to ride on a straight line or return to the original lane, a current target preceding vehicle is determined depending on whether the center of mass of the target lane change vehicle crosses the lane line of the current lane, so as to determine the target longitudinal traveling data of the target lane change vehicle in the lane change process based on a longitudinal speed of the current target preceding vehicle, and a distance between the current target preceding vehicle and the target lane change vehicle.

S207: Determine preset initial transverse traveling data, preset end transverse traveling data, and a preset lane change time in the lane change process.

In some embodiments, a transverse driving behavior is described by using a high-order polynomial. In the lane change process, traveling data of a vehicle in a transverse direction may be regarded as a change in a period from $t=t_0$ (a lane change start moment) to $t=T$ (a lane change end moment).

In some embodiments, the preset initial transverse traveling data corresponding to the lane change start moment, the preset end transverse traveling data corresponding to the lane change end moment, and the preset lane change time required by the lane change may be determined first.

S209: Determine target transverse traveling data of the target lane change vehicle in the lane change process according to the preset initial transverse traveling data, the preset end transverse traveling data, and the preset lane change time.

In some embodiments, when the target transverse traveling data of the target lane change vehicle in the lane change process is determined, the target transverse traveling data may be determined with reference to the high-order polynomial. Specifically, assuming that a lane change initial moment to =0, $(Qd_0, Vd_0, Ad_0)$ is used for describing a position, a speed, and an acceleration in the transverse direction at a moment t=0, $(Qd_T, Vd_T, Ad_T)$ is used for describing a position, a speed, and an acceleration in the transverse direction at a moment t=T, and h (which is usually a lane width) represents a distance from a center line of the original lane to a center line of the target lane. Correspondingly, $Vd_0=Vd_T=0$, $Ad_0=Ad_T=0$, $Qd_0=0$, and $Qd_T=h$.

In this way, there are six boundary conditions. Correspondingly, a fifth-order polynomial can be used for describing a position of the vehicle at any moment t in the transverse direction, that is, $Qd=a_0+a_1t+a_2t^2+a_3t^3+a_4t^4+a_5t^5$, and polynomial coefficients $a_0$, $a_1$, $a_2$, $a_3$, $a_4$ and as can be solved based on $Vd_0=Vd_T=0$, $Ad_0=Ad_T=0$, $Qd_0=0$, and $Qd_T=h$.

$a_0=Qd_0$ $a_1=Vd_0$ $a_2=0.5a_0$ $a_3=½T_3[20h-(8Vd_T+12Vd_0)T-(3a_0-a_1)T_2$ $a_4+=½T_4[-30h-(14Vd_T+16Vd_0)T+(3a_0-2a_1)T_2$ $a_5=½T_5[12h-6(Vd_T+Vd_0)T-(a_1-a_0)T_2$

Figure 4:
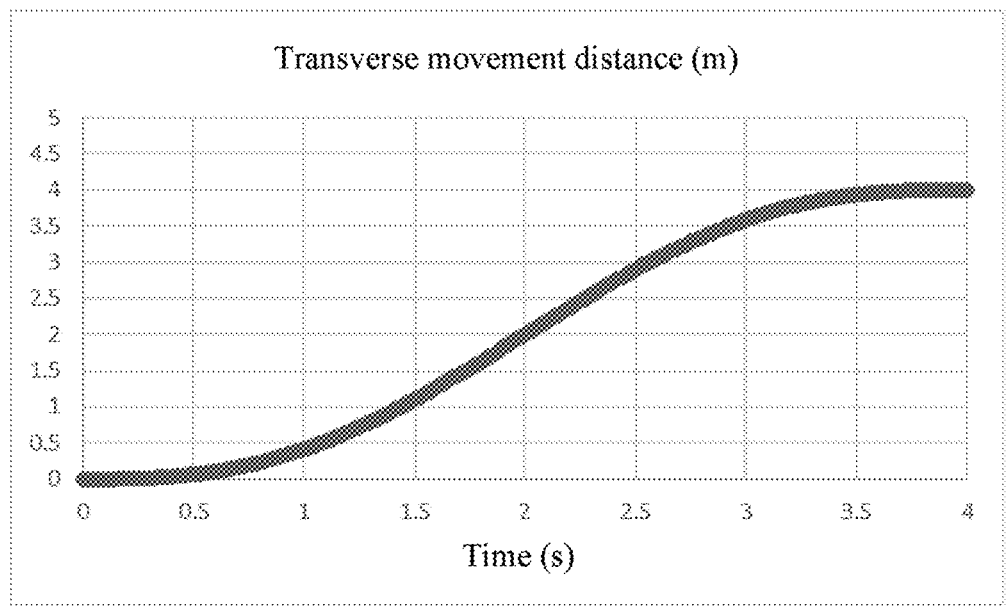
FIG. 4 is a schematic curve diagram of a transverse position (a transverse offset distance) that varies with time in a lane change process according to an embodiment of this disclosure.

After the polynomial coefficients $a_0$, $a_1$, $a_2$, $a_3$, $a_4$, and as are obtained, a transverse position of the target lane change vehicle at each moment may be determined. In a specific embodiment, as shown in FIG. 4, it is assumed that the lane width is 4 m, and the lane change time is 4s. FIG. 4 is a schematic curve diagram of a transverse position (a transverse offset distance) that varies with time in a lane change process according to an embodiment of this disclosure.

Figure 5:
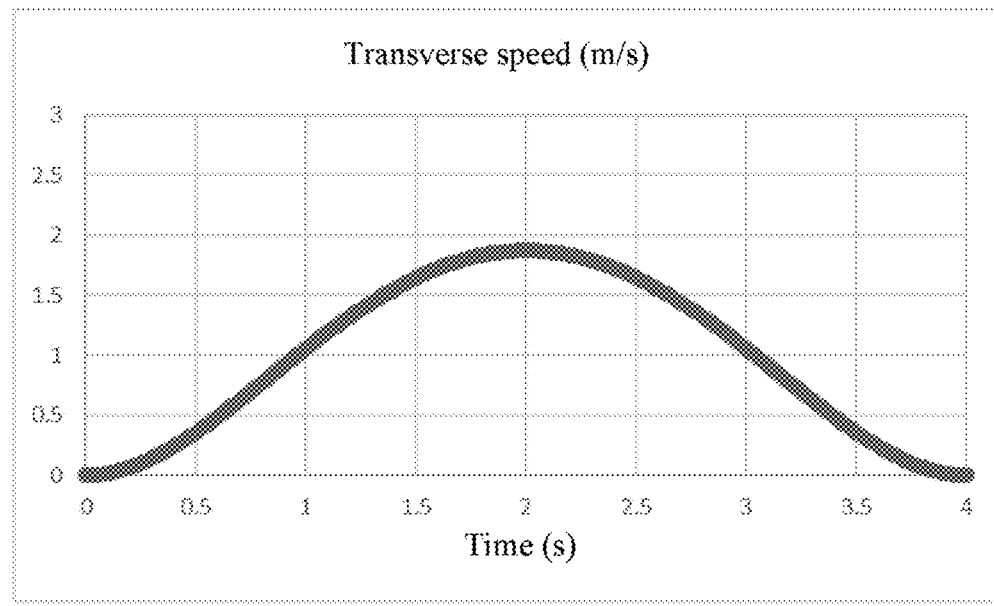
FIG. 5 is a schematic curve diagram of a transverse speed that varies with time in a lane change process according to an embodiment of this disclosure.

Further, based on the transverse position and transverse speeds in the preset initial transverse traveling data and the preset end transverse traveling data in the lane change process, a transverse speed at the each moment in the lane change process can be determined. In one embodiment, as shown in FIG. 5, it is assumed that the lane width is 4 m, and the lane change time is 4s. FIG. 5 is a schematic curve diagram of a transverse speed that varies with time in a lane change process according to an embodiment of this disclosure.

Figure 6:
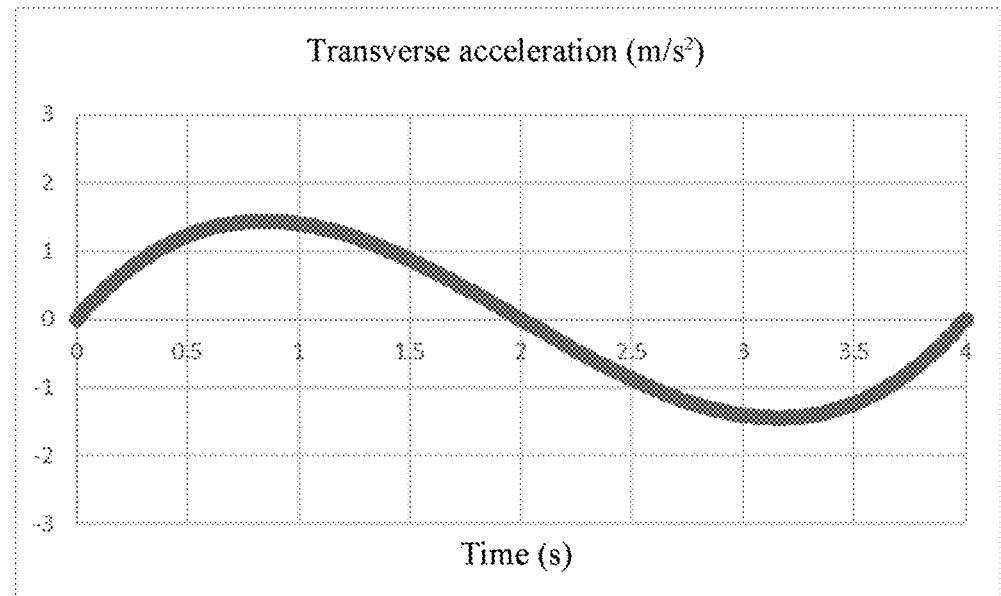
FIG. 6 is a schematic curve diagram of a transverse speed that varies with time in a lane change process according to an embodiment of this disclosure.

Further, a transverse acceleration in the lane change process may be determined based on the transverse speed in the lane change process. FIG. 6 is a schematic curve diagram of a transverse speed that varies with time in a lane change process according to an embodiment of this disclosure.

S211: Construct, when a preset lane change condition is met, or when the preset lane change condition is not met, but it is determined that the target lane change vehicle continues to change lanes, a first lane change trajectory of the target lane change vehicle in the lane change trajectory coordinate system based on the target transverse traveling data and the target longitudinal traveling data when a following vehicle in a target lane decelerates.

In some embodiments, in the lane change process of the vehicle, when an intention of changing lanes is determined, it is also necessary to determine whether a lane change condition is met based on the consideration of safety. In some embodiments, that the lane change condition can be met may include that distances or a distance between the target lane change vehicle and the preceding vehicle and/or the following vehicle in the target lane are or is greater than a specific preset safe distance.

In some embodiments, when the preset lane change condition is met, or when the preset lane change condition is not met, but it is determined to continue to change lanes, the first lane change trajectory of the target lane change vehicle in the lane change trajectory coordinate system may be constructed based on the target transverse traveling data and the target longitudinal traveling data when the following vehicle in the target lane decelerates. Specifically, first target lane change traveling data (including a speed, an acceleration, and a position) of the target lane change vehicle may be determined according to the target transverse traveling data and the target longitudinal traveling data, and the first lane change trajectory of the target lane change vehicle is constructed in the lane change trajectory coordinate system based on the first target lane change traveling data.

S213: Update, when the preset lane change condition is not met, but it is determined to continue to change lanes, an acceleration in the target longitudinal traveling data when the following vehicle does not decelerate, to cause an updated longitudinal speed to be greater than a longitudinal speed of the following vehicle and less than a longitudinal speed of a preceding vehicle in the target lane, and construct a second lane change trajectory of the target lane change vehicle in the lane change trajectory coordinate system based on the updated longitudinal traveling data and the target transverse traveling data.

In some embodiments, when the preset lane change condition is not met, but it is determined to continue to change lanes, in response to continuing to change lanes when the following vehicle does not decelerate, to avoid a collision accident, acceleration needs to be performed longitudinally, to cause a longitudinal acceleration of the target lane change vehicle to be higher than that of the following vehicle in the target lane, but be limited by a maximum acceleration (the maximum acceleration may be determined based on the longitudinal traveling data of the target lane change vehicle and longitudinal traveling data of the preceding vehicle in the target lane, to ensure that the target lane change vehicle does not collide with the preceding vehicle in the target lane while accelerating) and the longitudinal traveling data of the preceding vehicle in the target lane. In some embodiments, when the preset lane change condition is not met, but it is determined to continue to change lanes, the acceleration in the target longitudinal traveling data is updated when the following vehicle does not decelerate, to cause the updated longitudinal speed to be greater than the longitudinal speed of the following vehicle and less than the longitudinal speed of the preceding vehicle in the target lane; and then the second lane change trajectory of the target lane change vehicle is constructed in the lane change trajectory coordinate system based on the updated longitudinal traveling data and the target transverse traveling data. Specifically, second target lane change traveling data may be determined according to the updated longitudinal traveling data and the target transverse traveling data, and the second lane change trajectory of the target lane change vehicle is constructed in the lane change trajectory coordinate system based on the second target lane change traveling data.

S215: Update, when the preset lane change condition is not met, and it is determined not to continue to change lanes, transverse traveling data and longitudinal traveling data in an original lane return process, and construct a first original lane return trajectory of the target lane change vehicle in the lane change trajectory coordinate system according to the transverse traveling data and the longitudinal traveling data in the original lane return process.

In some embodiments, when the preset lane change condition is not met, and it is determined not to continue to change lanes, the original lane can be immediately returned to, and then, a surrounding condition is observed to determine whether to restart a new lane change process. Specifically, the transverse traveling data and the longitudinal traveling data in the original lane return process are updated, and the first original lane return trajectory of the target lane change vehicle is constructed in the lane change trajectory coordinate system based on the transverse traveling data and the longitudinal traveling data in the original lane return process.

Figure 7A:
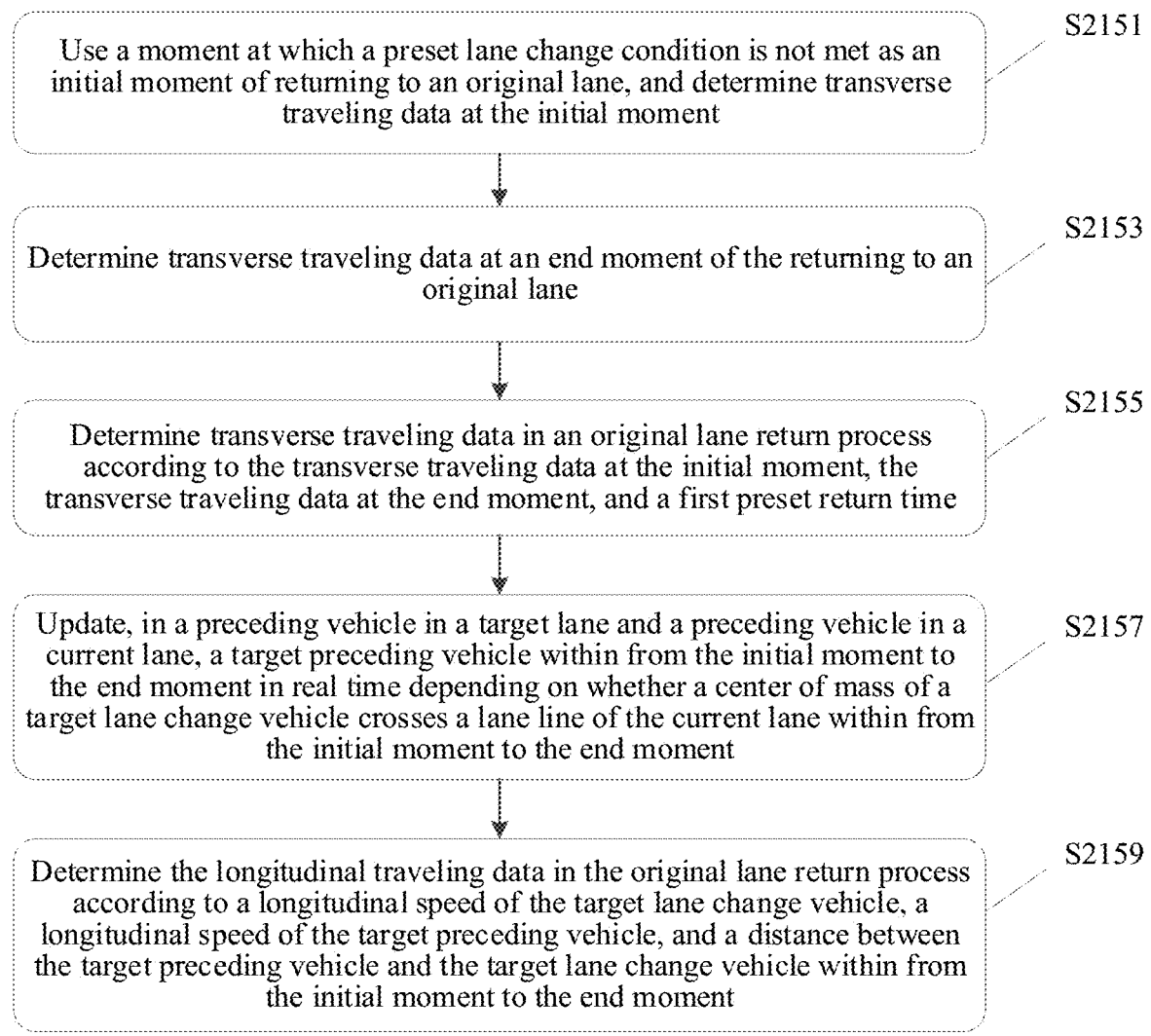
FIG. 7A is a schematic flowchart of updating transverse traveling data and longitudinal traveling data in an original lane return process according to an embodiment of this disclosure.

In some embodiments, as shown in FIG. 7A, the updating transverse traveling data and longitudinal traveling data in an original lane return process may include:

S2151: Use a moment at which the preset lane change condition is not met, and it is determined not to continue to change lanes as an initial moment of returning to an original lane, and determine transverse traveling data at the initial moment.

In some embodiments, before the preset lane change condition is no longer met, the target lane change vehicle changes lanes and travels based on the target transverse traveling data and the target longitudinal traveling data. Correspondingly, when the preset lane change condition is not met at a moment, transverse traveling data at this particular moment (the initial moment of returning to an original lane) is determined from the target transverse traveling data.

S2153: Determine transverse traveling data at an end moment of the returning to an original lane.

In some embodiments, the original lane return process refers to returning to a center line position. Correspondingly, a transverse position, a transverse acceleration, and a speed in the transverse traveling data at the end moment are all 0.

S2155: Determine the transverse traveling data in the original lane return process according to the transverse traveling data at the initial moment, the transverse traveling data at the end moment, and a first preset return time.

In some embodiments, if the transverse traveling data at the initial moment of the returning to an original lane is $(Qd_c, Vd_c, Ad_c)$, the transverse traveling data at the end moment is $(0, 0, 0)$, and a time required for returning to an original lane is a first preset return time $T_1$, correspondingly, the transverse traveling data in the original lane return process may be determined with reference to the polynomial. Specifically, the transverse traveling data in the original lane return process determined with reference to the polynomial may be seen in the foregoing related steps, and details are not described herein again.

S2157: Continuously update the target preceding vehicle for each moment from the initial moment to the end moment, by selecting from a preceding vehicle in the target lane and a preceding vehicle in the initial lane, depending on whether the center of mass of the target lane change vehicle crosses the lane line of the initial lane.

In some embodiments, in the original lane return process, the center of mass of the target lane change vehicle is changed from crossing the lane line of the current lane to not crossing the lane line of the current lane. In some embodiments, when the center of mass of the target lane change vehicle does not cross the lane line of the current lane, from a preceding vehicle in the target lane and a preceding vehicle in the current lane, the vehicle at a smaller current distance to the target lane change vehicle may be selected as the target preceding vehicle.

S2159: Determine, from the initial moment to the end moment, according to a longitudinal speed of the target lane change vehicle, a longitudinal speed of the target preceding vehicle, and a distance between the target preceding vehicle and the target lane change vehicle, the longitudinal traveling data in the original lane return process. It is to be understood that the longitudinal traveling data in the original lane return process is a combination of longitudinal traveling data for each moment from the initial moment to the end moment.

In some embodiments, for the determining longitudinal traveling data in the original lane return process, reference may be made to the foregoing related steps of determining the target longitudinal traveling data, and details are not described herein again.

In some embodiments, the constructing a first original lane return trajectory of the target lane change vehicle in the lane change trajectory coordinate system according to the transverse traveling data and the longitudinal traveling data in the original lane return process may include: determining first target lane change traveling data of the target lane change vehicle in the original lane return process according to the transverse traveling data and the target longitudinal traveling data in the original lane return process; and constructing the first original lane return trajectory of the target lane change vehicle in the lane change trajectory coordinate system based on the first target lane change traveling data.

It may be learned from the technical solutions in the embodiments of this specification that, in this application, a lane change trajectory coordinate system is constructed, then, a traveling status in a lane change process is represented by transverse traveling data and longitudinal traveling data respectively, for different statuses encountered in the lane change process, different lane change trajectories are constructed with reference to the transverse traveling data and the longitudinal traveling data, and an original lane return trajectory is constructed when a lane change cannot be completed at a time because a following vehicle located behind the present vehicle in the target lane accelerates instead of yielding. In this way, a simulated trajectory can reflect the reality better, and can provide effective decision-making support for practical application of automatic driving.

Figure 7B:
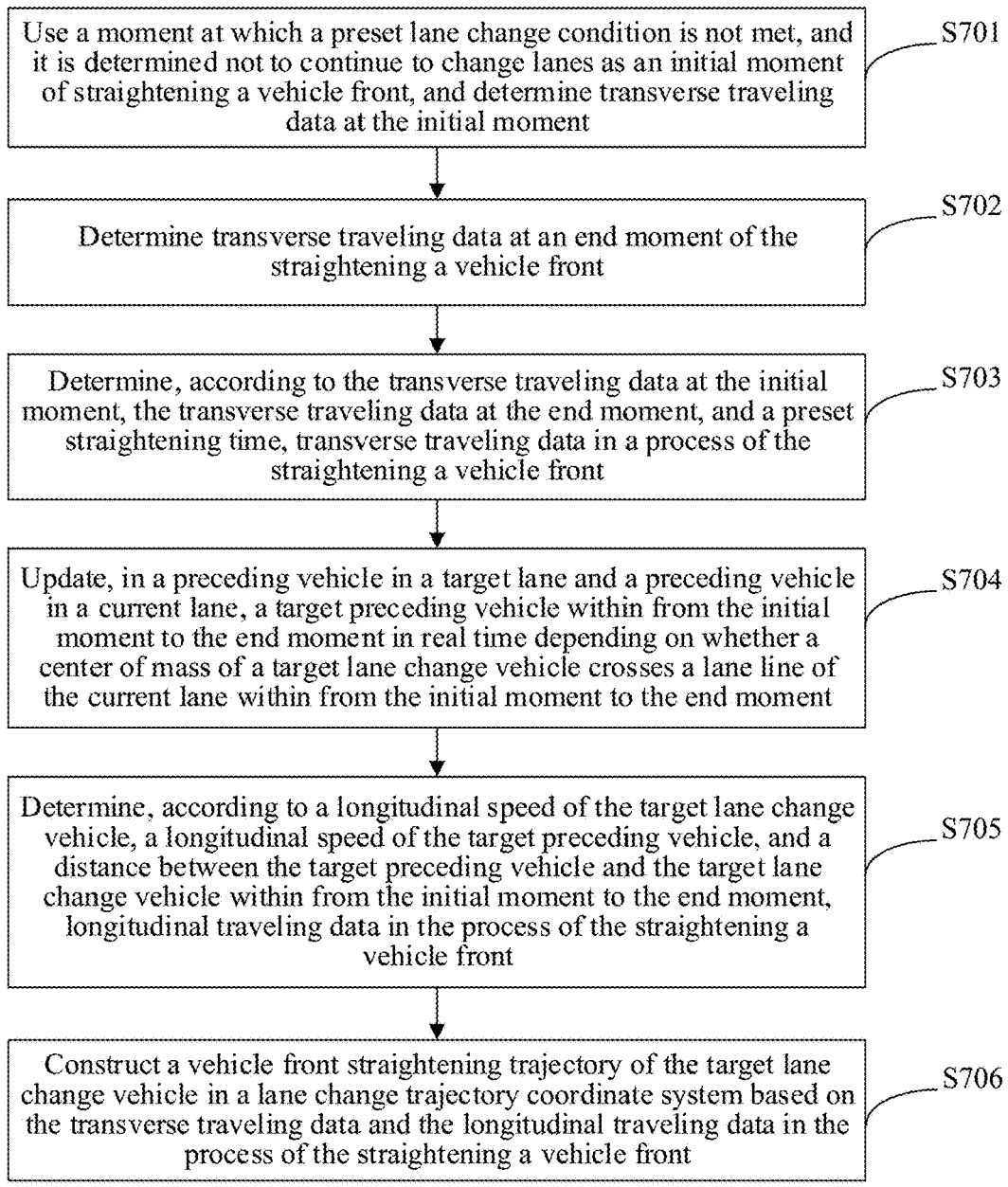
FIG. 7B is a schematic flowchart of a method for constructing a simulated vehicle lane change trajectory when a preset lane change condition is not met according to an embodiment of this disclosure.

In some embodiments, if the preset lane change condition is not met, and it is determined not to continue to change lanes, a vehicle front may be straightened to be parallel to the lane line, and keep riding on a straight line, so that a status of a following vehicle is further observed, and then a next action is determined depending on whether the following vehicle decelerates and yields. In this case, the target lane change vehicle may ride along the lane line between the initial lane and the target lane. FIG. 7B is a schematic flowchart of a method for constructing a simulated vehicle lane change trajectory when a preset lane change condition is not met according to an embodiment of this disclosure. As shown in FIG. 7B, when the preset lane change condition is not met, the method further includes:

Step S701: Use a moment at which a preset lane change condition is not met, and it is determined not to continue to change lanes as an initial moment of straightening a vehicle front, and determine transverse traveling data at the initial moment.

Step S702: Determine transverse traveling data at an end moment of the straightening a vehicle front.

Step S703: Determine, according to the transverse traveling data at the initial moment, the transverse traveling data at the end moment, and a preset straightening time, transverse traveling data in a process of the straightening a vehicle front.

In some embodiments, if transverse traveling data corresponding to an initial moment the of straightening a vehicle front is $(Qd_c, Vd_c, Ad_c)$, correspondingly, transverse traveling data at an end moment is $(Qd_c, 0, 0)$. In other words, if the vehicle front is straightened, the vehicle is kept at the same transverse position, and a transverse acceleration and a transverse speed are both 0. Assuming that a preset vehicle front straightening time is $T_2$, the transverse traveling data of the target lane change vehicle may be updated with reference to the polynomial correspondingly. For specific steps, reference may be made to the foregoing related steps, and details are not described herein again.

Step S704: Continuously update the target preceding vehicle for each moment from the initial moment to the end moment, by selecting from a preceding vehicle in the target lane and a preceding vehicle in the initial lane, depending on whether the center of mass of the lane change vehicle crosses the lane line of the initial lane.

Step S705: Determine, according to a longitudinal speed of the target lane change vehicle, a longitudinal speed of the target preceding vehicle, and a distance between the target preceding vehicle and the target lane change vehicle within from the initial moment to the end moment, longitudinal traveling data in the process of the straightening a vehicle front.

In some embodiments, the target preceding vehicle may be timely updated depending on whether the center of mass of the target lane change vehicle crosses the lane line of the current lane in the process of the straightening a vehicle front. Then, the longitudinal traveling data in the process of the straightening a vehicle front is updated with reference to the longitudinal speed of the target preceding vehicle and the distance between the target preceding vehicle and the target lane change vehicle.

Step S706: Construct a vehicle front straightening trajectory of the target lane change vehicle in a lane change trajectory coordinate system based on the transverse traveling data and the longitudinal traveling data in the process of the straightening a vehicle front.

Specifically, target straightening traveling data in the process of the straightening a vehicle front may be determined according to the transverse traveling data in the process of the straightening a vehicle front and the target longitudinal traveling data; and a vehicle front straightening trajectory of the target lane change vehicle is constructed in the lane change trajectory coordinate system based on the target straightening traveling data.

Figure 7C:
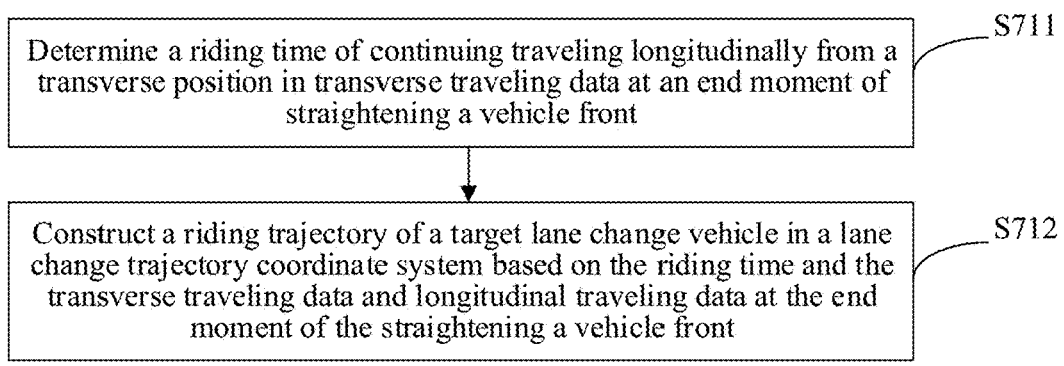
FIG. 7C is a schematic flowchart of a method for constructing a simulated vehicle lane change trajectory after a vehicle front is straightened according to an embodiment of this disclosure.

In some embodiments, after the vehicle front is straightened, the vehicle rides on a straight line for a period of time along a direction after the straightening. FIG. 7C is a schematic flowchart of a method for constructing a simulated vehicle lane change trajectory after a vehicle front is straightened according to an embodiment of this disclosure. As shown in FIG. 7C, the method further includes the following steps:

Step S711: Determine a riding time of continuing traveling longitudinally from a transverse position in the transverse traveling data at the end moment of the straightening a vehicle front.

Step S712: Construct a riding trajectory of the target lane change vehicle in the lane change trajectory coordinate system based on the riding time and the transverse traveling data and the longitudinal traveling data at the end moment of the straightening a vehicle front.

Figure 7D:
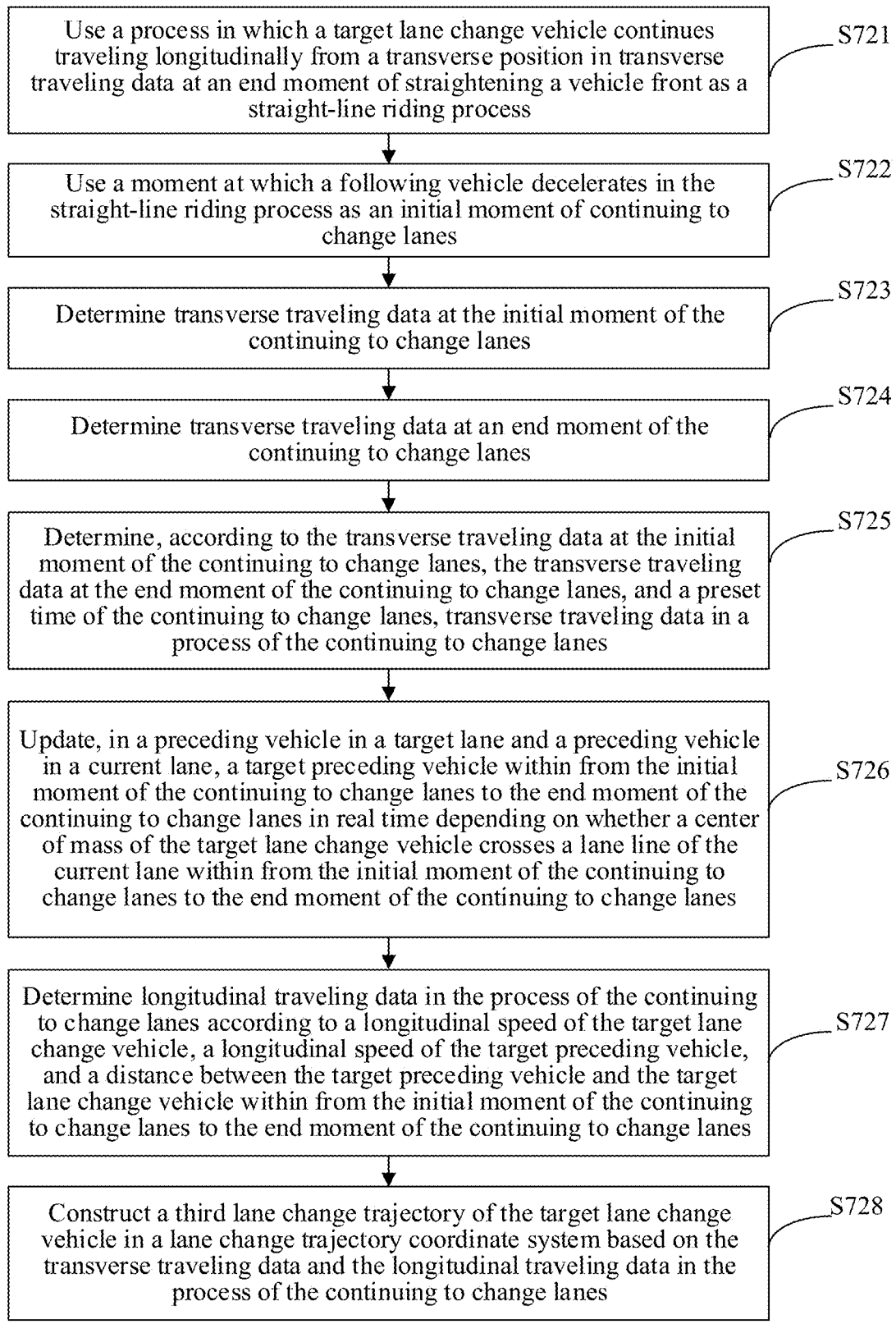
FIG. 7D is a schematic flowchart of a method for constructing a simulated vehicle lane change trajectory when continuing to change lanes after determining that a following vehicle decelerates and yields according to an embodiment of this disclosure.

In some embodiments, after the vehicle front is straightened, in the straight-line riding process along the straightened direction, whether the following vehicle decelerates and yields may be observed. After the following vehicle decelerates, the target lane change vehicle may continue to change lanes. If the following vehicle decelerates or yields, then the lane change process may be continued. FIG. 7D is a schematic flowchart of a method for constructing a simulated vehicle lane change trajectory when continuing to change lanes after determining that a following vehicle decelerates and yields according to an embodiment of this disclosure. As shown in FIG. 7D, the method further includes the following steps:

Step S721: Use a process in which the target lane change vehicle continues traveling longitudinally from a transverse position in the transverse traveling data at the end moment of the straightening a vehicle front as a straight-line riding process.

Step S722: Use a moment at which the following vehicle decelerates in the straight-line riding process as an initial moment of continuing to change lanes.

Step S723: Determine transverse traveling data at the initial moment of the continuing to change lanes.

Step S724: Determine transverse traveling data at an end moment of the continuing to change lanes.

Step S725: Determine, according to the transverse traveling data at the initial moment of the continuing to change lanes, the transverse traveling data at the end moment of the continuing to change lanes, and a preset time of the continuing to change lanes, transverse traveling data in a process of the continuing to change lanes.

In some embodiments, it is assumed that the transverse traveling data at the initial moment of the continuing to change lanes is $(Qd_c, 0, 0)$, the transverse traveling data at the end moment of the continuing to change lanes is $(h, 0, 0)$, and h is the lane width. In other words, the target lane change vehicle is offset by one lane relative to the center line of the original lane at the end of continuing to change lanes, and a time required for continuing to change lanes is $T_4$. Similarly, the transverse traveling data of the target lane change vehicle may be updated with reference to the polynomial. For specific steps, reference may be made to the foregoing related steps, and details are not described herein again.

Step S726: Continuously update the target preceding vehicle in real time, for each moment from the initial moment of the continuing to change lanes to the end moment of the continuing to change lanes, by selecting from a preceding vehicle in the target lane and a preceding vehicle in the initial lane, depending on whether the center of mass of the target lane change vehicle crosses the lane line of the initial lane.

Step S727: Determine longitudinal traveling data in the process of the continuing to change lanes according to a longitudinal speed of the target lane change vehicle, a longitudinal speed of the target preceding vehicle, and a distance between the target preceding vehicle and the target lane change vehicle within from the initial moment of the continuing to change lanes to the end moment of the continuing to change lanes.

In this embodiments of this specification, the target preceding vehicle may be timely updated depending on whether the center of mass of the target lane change vehicle crosses the lane line of the current lane in the process of the continuing to change lanes. Then, the longitudinal traveling data in the process of the continuing to change lanes is updated with reference to the longitudinal speed of the target preceding vehicle and the distance between the target preceding vehicle and the target lane change vehicle.

Step S728: Construct a third lane change trajectory of the target lane change vehicle in the lane change trajectory coordinate system based on the transverse traveling data and the longitudinal traveling data in the process of the continuing to change lanes.

Specifically, third target lane change traveling data in the process of the continuing to change lanes may be determined according to the transverse traveling data and the target longitudinal traveling data in the process of the continuing to change lanes, and a third lane change trajectory of the target lane change vehicle is constructed in the lane change trajectory coordinate system based on the third target lane change traveling data.

Figure 7E:
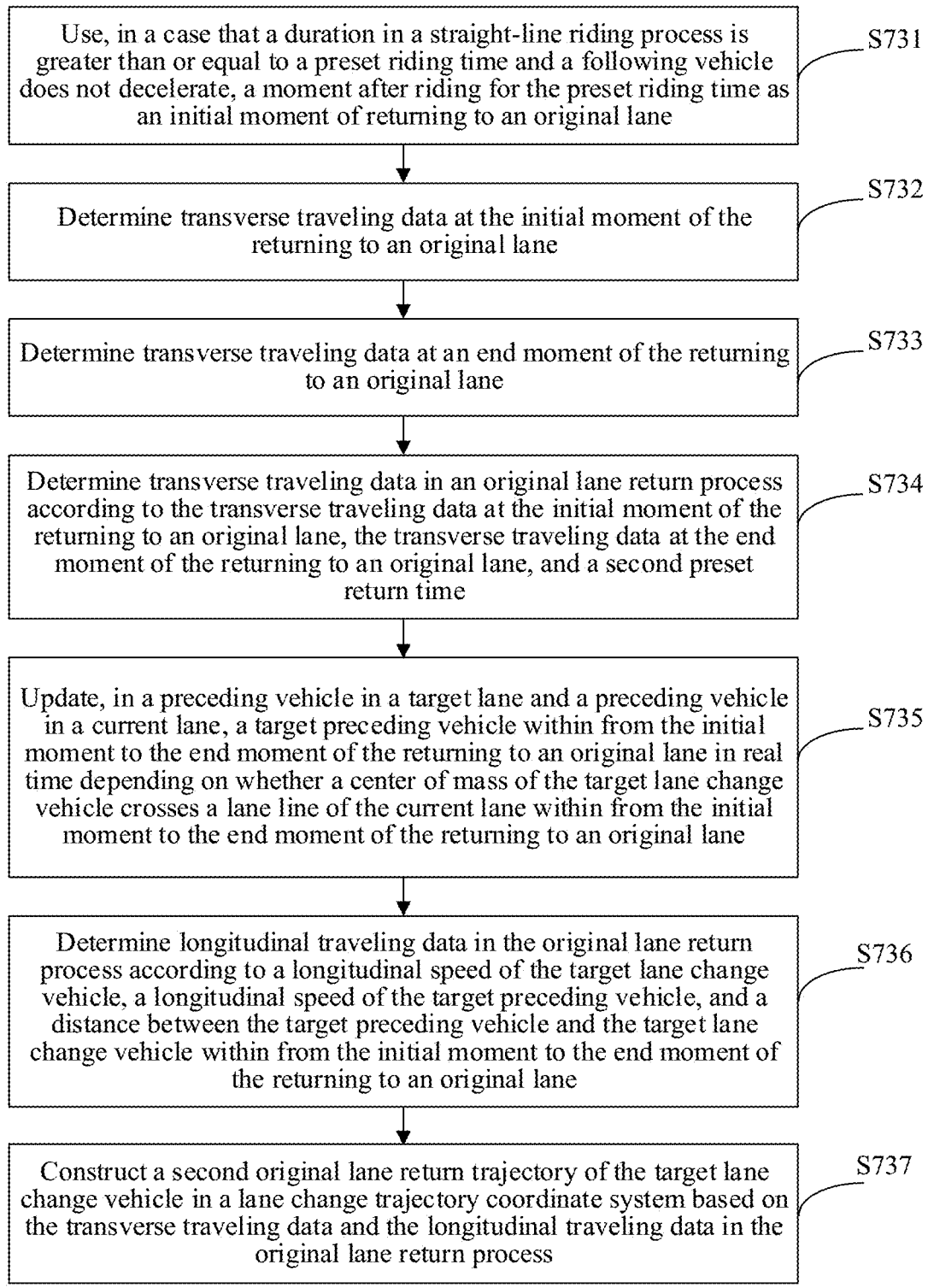
FIG. 7E is a schematic flowchart of a method for constructing a simulated vehicle lane change trajectory during returning to an original lane according to an embodiment of this disclosure.

In some embodiments, after the vehicle front is straightened, in the straight-line riding process along the straightened direction, whether the following vehicle decelerates and yields may be observed. If the following vehicle still does not decelerate or yield after the riding on a straight line for a period of time, the target lane change vehicle may choose to return to the original lane. FIG. 7E is a schematic flowchart of a method for constructing a simulated vehicle lane change trajectory during returning to an original lane according to an embodiment of this disclosure. As shown in FIG. 7E, the method further includes the following steps:

Step S731: Use, when a duration in a straight-line riding process is greater than or equal to a preset riding time, and a following vehicle does not decelerate, a moment after riding for the preset riding time as an initial moment of returning to an original lane.

Step S732: Determine transverse traveling data at the initial moment of the returning to an original lane.

Step S733: Determine transverse traveling data at an end moment of the returning to an original lane.

Step S734: Determine transverse traveling data in an original lane return process according to the transverse traveling data at the initial moment of the returning to an original lane, the transverse traveling data at the end moment of the returning to an original lane, and a second preset return time.

In the embodiments of this specification, it is assumed that the transverse traveling data at the initial moment of the returning to an original lane is $(Qd_c, 0, 0)$, the transverse traveling data at the end moment of the returning to an original lane is $(0, 0, 0)$, and a time required for returning to the original lane is $T_5$. Similarly, the transverse traveling data of the target lane change vehicle may be updated with reference to the polynomial. For specific steps, reference may be made to the foregoing related steps, and details are not described herein again.

Step S735: Continuously update the target preceding vehicle in real time, for each moment from the initial moment of the returning to an original lane to the end moment of the returning to an original lane, by selecting from a preceding vehicle in the target lane and a preceding vehicle in the initial lane, depending on whether the center of mass of the target lane change vehicle crosses the lane line of the initial lane.

Step S736: Determine longitudinal traveling data in the original lane return process according to a longitudinal speed of the target lane change vehicle, a longitudinal speed of the target preceding vehicle, and a distance between the target preceding vehicle and the target lane change vehicle within from the initial moment to the end moment of the returning to an original lane.

In the embodiments of this specification, the target preceding vehicle may be timely updated depending on whether the center of mass of the target lane change vehicle crosses the lane line of the current lane in the original lane return process. Then, the longitudinal traveling data in the original lane return process is updated with reference to the longitudinal speed of the target preceding vehicle and the distance between the target preceding vehicle and the target lane change vehicle.

Step S737: Construct a second original lane return trajectory of the target lane change vehicle in the lane change trajectory coordinate system based on the transverse traveling data and the longitudinal traveling data in the original lane return process.

Specifically, second target returning traveling data in the original lane return process may be determined according to the transverse traveling data in the original lane return process and the target longitudinal traveling data, and a second original lane return trajectory of the target lane change vehicle is constructed in the lane change trajectory coordinate system based on the second target returning traveling data.

In some other embodiments, if the preset lane change condition is not met, but it is determined to continue to change lanes, the target lane change vehicle still change lanes by using the target transverse traveling data and the longitudinal traveling data, which may cause a collision accident. Correspondingly, the collision accident may be recorded.

In some other embodiments, in a simulation system, trajectories of different status in the foregoing lane change processes may be set to be activated at a specific proportion (or probability), and a sub-status in each status may also be set to be activated at a specific proportion (or probability). Correspondingly, the method further includes:
  setting a proportion for each lane change scenario corresponding to the first lane change trajectory, the second lane change trajectory, the first original lane return trajectory, and the second original lane return trajectory; and
  constructing a lane change scenario (or a lane change simulation) of the target lane change vehicle based on the lane change scenarios with the specified proportion.

In some embodiments, when lane change scenarios in the simulation system are constructed, a proportion of the lane change scenarios corresponding to different lane change status is set to ensure that an overall lane change scenario of the simulation system reflects the reality better, and provides effective decision-making support for practical application of automatic driving.

Figure 8:
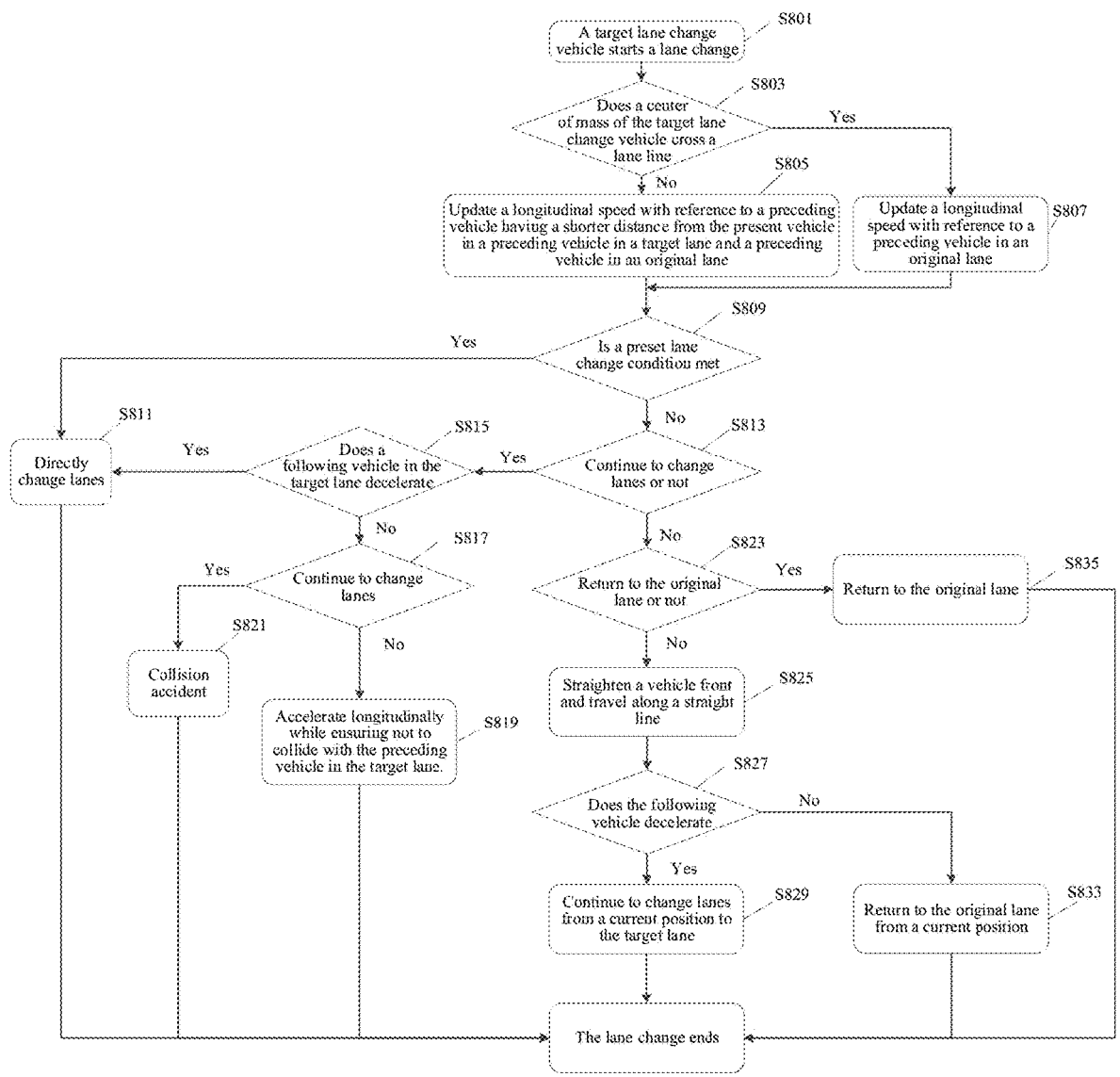
FIG. 8 is a schematic flowchart of simulated lane change driving according to an embodiment of this disclosure.

In a specific embodiment, FIG. 8 is a schematic flowchart of simulated lane change driving according to an embodiment of this disclosure. Specifically, the method may include:

S801: A target lane change vehicle starts a lane change.

S803: Determine whether a center of mass of the target lane change vehicle crosses a lane line.

S805: Update, when a result determined in step S803 is not, a longitudinal speed with reference to a target preceding vehicle, the target preceding vehicle is selected from a preceding vehicle in a target lane and a preceding vehicle in an original lane based on which has a shorter distance from the present lance change vehicle.

S807: Update, when the result determined in step S803 is yes, a longitudinal speed with reference to a preceding vehicle in an original lane.

S809: Determine whether a preset lane change condition is met.

S811: Directly change lanes when the preset lane change condition is met.

S813: Determine whether to continue to change lanes when the preset lane change condition is not met.

S815: Determine whether a following vehicle in the target lane decelerates in response to continuing to change lanes.

Step S811 is returned to when the following vehicle decelerate, to directly change lanes.

S817: Determine whether to continue to change lanes when the following vehicle does not decelerate.

S819: Accelerate, in response to not continuing to change lanes, longitudinally while ensuring not to collide with the preceding vehicle in the target lane.

S821: Record a collision accident in response to continuing to change lanes.

S823: Determine whether to return to the original lane when a result determined in step S813 is not.

S825: Straighten a vehicle front and travel along a straight line in response to not returning to the original lane.

S827: Determine whether the following vehicle decelerates.

S829: Continue to change lanes from a current position to the target lane when the following vehicle decelerates.

S831: Return to the original lane from the current position when the following vehicle does not decelerate.

S833: Return to the original lane when a result determined in step S823 is yes.

In the lane change scenarios formed by the trajectories constructed based on the method for constructing a simulated vehicle lane change trajectory provided in this specification, an actual lane change scenario may be better simulated in simulated driving.

Figure 9A:
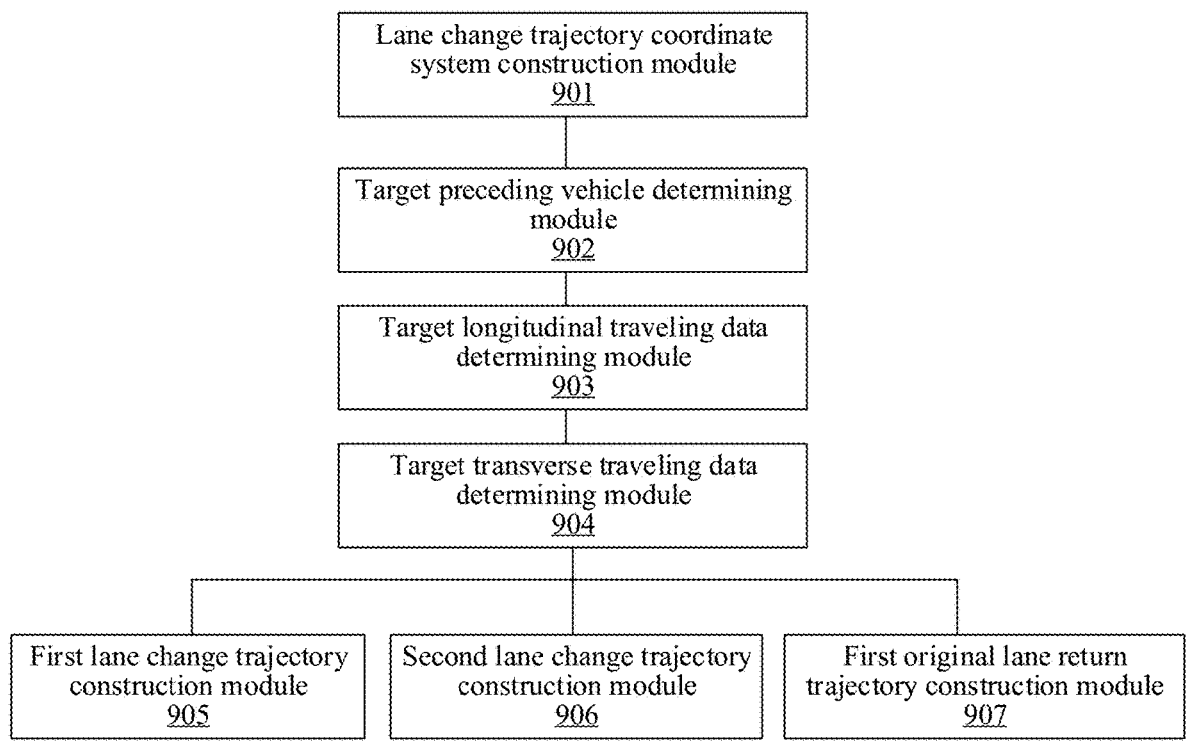
FIG. 9A is a schematic structural diagram of an apparatus for constructing a simulated vehicle lane change trajectory according to an embodiment of this disclosure.

The embodiments of this application further provide an apparatus for constructing a simulated vehicle lane change trajectory. In this disclosure, a unit and a module may be hardware such as a combination of electronic circuitries; firmware; or software such as computer instructions. The unit and the module may also be any combination of hardware, firmware, and software. In some implementation, a unit may include at least one module. As shown in FIG. 9A, the apparatus includes:
  a lane change trajectory coordinate system construction module 901, configured to construct a lane change trajectory coordinate system by using a position of a target lane change vehicle as an origin, a center line of a current lane of the target lane change vehicle along a traveling direction as an ordinate axis, and a normal direction of the center line as an abscissa axis direction;
  a target preceding vehicle determining module 902, configured to determine a target preceding vehicle according to the position of the target lane change vehicle;
  a target longitudinal traveling data determining module 903, configured to determine target longitudinal traveling data of the target lane change vehicle in a lane change process according to a longitudinal speed of the target lane change vehicle, a longitudinal speed of the target preceding vehicle, and a distance between the target preceding vehicle and the target lane change vehicle at each moment in the lane change process;
  a target transverse traveling data determining module 904, configured to determine target transverse traveling data of the target lane change vehicle in the lane change process according to preset initial transverse traveling data, preset end transverse traveling data, and a preset lane change time in the lane change process;

a first lane change trajectory construction module 905, configured to construct, when a preset lane change condition is met, or when the preset lane change condition is not met, but it is determined to continue to change lanes, a first lane change trajectory of the target lane change vehicle in the lane change trajectory coordinate system based on the target transverse traveling data and the target longitudinal traveling data when a following vehicle in a target lane decelerates;

a second lane change trajectory construction module 906, configured to update, when the preset lane change condition is not met, but it is determined to continue to change lanes, an acceleration in the target longitudinal traveling data when the following vehicle does not decelerate, to cause an updated longitudinal speed to be greater than a longitudinal speed of the following vehicle and less than a longitudinal speed of a preceding vehicle in the target lane, and construct a second lane change trajectory of the target lane change vehicle in the lane change trajectory coordinate system based on the updated longitudinal traveling data and the target transverse traveling data; and a first original lane return trajectory construction module 907, configured to update, when the preset lane change condition is not met, and it is determined not to continue to change lanes, transverse traveling data and longitudinal traveling data in an original lane return process, and construct a first original lane return trajectory of the target lane change vehicle in the lane change trajectory coordinate system according to the transverse traveling data and the longitudinal traveling data in the original lane return process.

In some embodiments, the target preceding vehicle determining module 902 is further configured to determine the target preceding vehicle from the preceding vehicle in the target lane and a preceding vehicle in the current lane depending on whether a center of mass of the target lane change vehicle crosses a lane line of the current lane.

In some embodiments, the target transverse traveling data determining module 904 includes a data determining sub-module and a target transverse traveling data determining sub-module.

The data determining sub-module is configured to determine the preset initial transverse traveling data, the preset end transverse traveling data, and the preset lane change time in the lane change process.

The target transverse traveling data determining sub-module is configured to determine target transverse traveling data of the target lane change vehicle in the lane change process according to the preset initial transverse traveling data, the preset end transverse traveling data, and the preset lane change time.

Figure 9B:
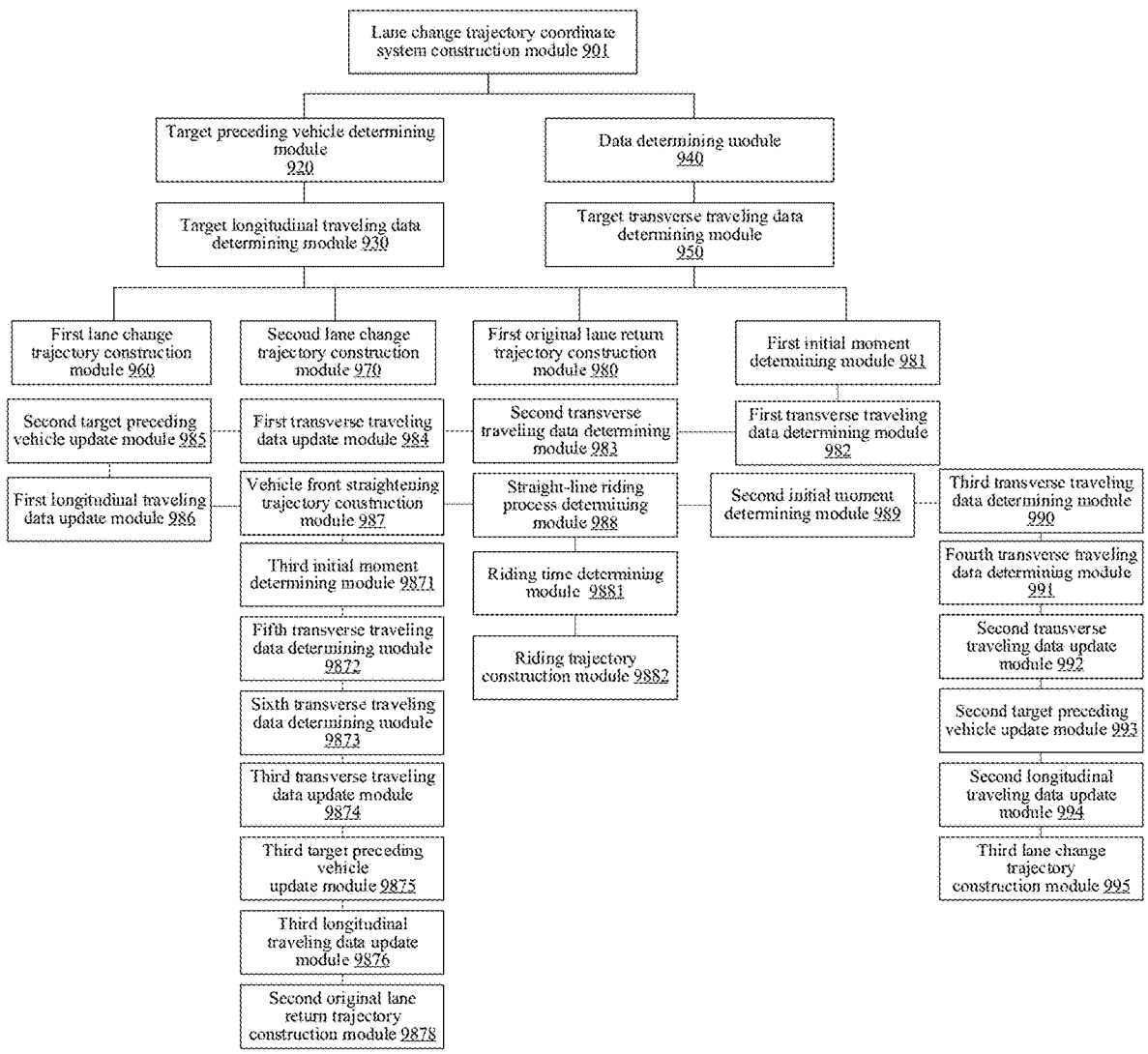
FIG. 9B is a schematic structural diagram of an apparatus for constructing a simulated vehicle lane change trajectory according to an embodiment of this disclosure.

The embodiments of this application further provide an apparatus for constructing a simulated vehicle lane change trajectory. As shown in FIG. 9B, the apparatus includes:

a lane change trajectory coordinate system construction module 910, configured to construct a lane change trajectory coordinate system by using a position of a target lane change vehicle as an origin, a center line of a current lane of the target lane change vehicle along a traveling direction as an ordinate axis, and a normal direction of the center line as an abscissa axis direction;

a target preceding vehicle determining module 920, configured to determine a target preceding vehicle from the preceding vehicle in a target lane and a preceding vehicle in a current lane depending on whether a center of mass of the target lane change vehicle crosses a lane line of the current lane.

a target longitudinal traveling data determining module 930, configured to determine target longitudinal traveling data of the target lane change vehicle in a lane change process according to a longitudinal speed of the target lane change vehicle, a longitudinal speed of the target preceding vehicle, and a distance between the target preceding vehicle and the target lane change vehicle at each moment in the lane change process;

a data determining module 940, configured to determine preset initial transverse traveling data, preset end transverse traveling data, and a preset lane change time in the lane change process;

a target transverse traveling data determining module 950, configured to determine target transverse traveling data of the target lane change vehicle in the lane change process according to the preset initial transverse traveling data, the preset end transverse traveling data, and the preset lane change time;

a first lane change trajectory construction module 960, configured to construct, when a preset lane change condition is met, or when the preset lane change condition is not met, but it is determined to continue to change lanes, a first lane change trajectory of the target lane change vehicle in the lane change trajectory coordinate system based on the target transverse traveling data and the target longitudinal traveling data when a following vehicle in a target lane decelerates;

a second lane change trajectory construction module 970, configured to update, when the preset lane change condition is not met, but it is determined to continue to change lanes, an acceleration in the target longitudinal traveling data when the following vehicle does not decelerate, to cause an updated longitudinal speed to be greater than a longitudinal speed of the following vehicle and less than a longitudinal speed of a preceding vehicle in the target lane, and construct a second lane change trajectory of the target lane change vehicle in the lane change trajectory coordinate system based on the updated longitudinal traveling data and the target transverse traveling data; and a first original lane return trajectory construction module 980, configured to update, when the preset lane change condition is not met, and it is determined not to continue to change lanes, transverse traveling data and longitudinal traveling data in an original lane return process, and construct a first original lane return trajectory of the target lane change vehicle in the lane change trajectory coordinate system according to the transverse traveling data and the longitudinal traveling data in the original lane return process.

In some embodiments, the first original lane return trajectory construction module 980 is further configured to: use a moment at which the preset lane change condition is not met as an initial moment of returning to an original lane, and determine transverse traveling data at the initial moment;

determine transverse traveling data at an end moment of the returning to an original lane;

determine the transverse traveling data in the original lane return process according to the transverse traveling data at the initial moment, the transverse traveling data at the end moment, and a first preset return time;

update, in the preceding vehicle in the target lane and the preceding vehicle in the current lane, a target preceding vehicle within from the initial moment to the end moment in real time depending on whether the center of mass of the target lane change vehicle crosses the lane line of the current lane within from the initial moment to the end moment; and determine the longitudinal traveling data in the original lane return process according to a longitudinal speed of the target lane change vehicle, a longitudinal speed of the target preceding vehicle, and a distance between the target preceding vehicle and the target lane change vehicle within from the initial moment to the end moment.

In some embodiments, when the preset lane change condition is not met, the apparatus further includes:

a first initial moment determining module 981, configured to use the moment at which the preset lane change condition is not met as an initial moment of straightening a vehicle front;

a first transverse traveling data determining module 982, configured to determine transverse traveling data at the initial moment;

a second transverse traveling data determining module 983, configured to determine transverse traveling data at an end moment of the straightening a vehicle front;

a first transverse traveling data update module 984, configured to determine, according to the transverse traveling data at the initial moment, the transverse traveling data at the end moment, and a preset straightening time, transverse traveling data in a process of the straightening a vehicle front;

a second target preceding vehicle update module 985, configured to update, in the preceding vehicle in the target lane and the preceding vehicle in the current lane, a target preceding vehicle within from the initial moment to the end moment in real time depending on whether the center of mass of the target lane change vehicle crosses the lane line of the current lane within from the initial moment to the end moment;

a first longitudinal traveling data update module 986, configured to determine, according to a longitudinal speed of the target lane change vehicle, a longitudinal speed of the target preceding vehicle, and a distance between the target preceding vehicle and the target lane change vehicle within from the initial moment to the end moment, longitudinal traveling data in the process of the straightening a vehicle front; and a vehicle front straightening trajectory construction module 987, configured to construct a vehicle front straightening trajectory of the target lane change vehicle in the lane change trajectory coordinate system based on the transverse traveling data and the longitudinal traveling data in the process of the straightening a vehicle front.

In some embodiments, the apparatus further includes:

a straight-line riding process determining module 988, configured to use a process in which the target lane change vehicle continues traveling longitudinally from a transverse position in the transverse traveling data at the end moment of the straightening a vehicle front as a straight-line riding process;

a second initial moment determining module 989, configured to use a moment at which the following vehicle decelerates in the straight-line riding process as an initial moment of continuing changing a lane;

a third transverse traveling data determining module 990, configured to determine transverse traveling data at the initial moment of the continuing to change lanes;

a fourth transverse traveling data determining module 991, configured to determine transverse traveling data at an end moment of the continuing to change lanes;

a second transverse traveling data update module 992, configured to determine, according to the transverse traveling data at the initial moment, the transverse traveling data at the end moment, and a preset time of the continuing to change lanes, transverse traveling data in a process of the continuing to change lanes;

a second target preceding vehicle update module 993, configured to update, from the preceding vehicle in the target lane and the preceding vehicle in the current lane, the target preceding vehicle within from the initial moment of the continuing to change lanes to the end moment of the continuing to change lanes in real time depending on whether the center of mass of the target lane change vehicle crosses the lane line of the current lane within from the initial moment of the continuing to change lanes to the end moment of the continuing to change lanes;

a second longitudinal traveling data update module 994, configured to determine longitudinal traveling data in the process of the continuing to change lanes according to a longitudinal speed of the target lane change vehicle, a longitudinal speed of the target preceding vehicle, and a distance between the target preceding vehicle and the target lane change vehicle within from the initial moment of the continuing to change lanes to the end moment of the continuing to change lanes; and a third lane change trajectory construction module 995, configured to construct a third lane change trajectory of the target lane change vehicle in the lane change trajectory coordinate system based on the transverse traveling data and the longitudinal traveling data in the process of the continuing to change lanes.

In some embodiments, the apparatus further includes:

a third initial moment determining module 9871, configured to use, if a duration in the straight-line riding process is greater than or equal to a preset riding time and the following vehicle does not decelerate, a moment after riding for the preset riding time as an initial moment of returning to an original lane;

a fifth transverse traveling data determining module 9872, configured to determine transverse traveling data at the initial moment of the returning to an original lane;

a sixth transverse traveling data determining module 9873, configured to determine transverse traveling data at an end moment of the returning to an original lane;

a third transverse traveling data update module 9874, configured to determine transverse traveling data in an original lane return process according to the transverse traveling data at the initial moment of the returning to an original lane, the transverse traveling data at the end moment of the returning to an original lane, and a preset straightening time;

a third target preceding vehicle update module 9875, configured to update, from the preceding vehicle in the target lane and the preceding vehicle in the current lane, the target preceding vehicle within from the initial moment to the end moment of the returning to an original lane in real time depending on whether the center of mass of the target lane change vehicle crosses the lane line of the current lane within from the initial moment to the end moment of the returning to an original lane;

a third longitudinal traveling data update module 9876, configured to determine the longitudinal traveling data in the original lane return process according to a longitudinal speed of the target lane change vehicle, a longitudinal speed of the target preceding vehicle, and a distance between the target preceding vehicle and the target lane change vehicle within from the initial moment to the end moment of the returning to an original lane; and a second original lane return trajectory construction module 9878, configured to construct a second original lane return trajectory of the target lane change vehicle in the lane change trajectory coordinate system based on the transverse traveling data and the longitudinal traveling data in the original lane return process.

In some embodiments, the apparatus further includes:

a riding time determining module 9879, configured to determine a riding time of continuing traveling longitudinally from a transverse position in the transverse traveling data at the end moment of the straightening a vehicle front; and a riding trajectory construction module 9880, configured to construct a riding trajectory of the target lane change vehicle in the lane change trajectory coordinate system based on the riding time and the transverse traveling data and the longitudinal traveling data at the end moment of the straightening a vehicle front.

In some embodiments, the apparatus further includes: a recording module, configured to record, when the preset lane change condition is not met, but it is determined to continue to change lanes, a collision accident when the following vehicle does not decelerate.

In some embodiments, the apparatus further includes:

a lane change scenario proportion setting module, configured to set a proportion of lane change scenarios corresponding to the first lane change trajectory, the second lane change trajectory, the first original lane return trajectory, and the second original lane return trajectory; and a lane change scenario construction module, configured to construct a lane change scenario of the target lane change vehicle based on the lane change scenarios with the specified proportion.

The apparatus in the apparatus embodiment is based on the same application idea as the method embodiments.

The embodiments of this application provide a device for constructing a simulated vehicle lane change trajectory, including a processor and a memory, the memory storing at least one instruction, at least one program, a code set, or an instruction set, the at least one instruction, the at least one program, the code set, or the instruction set being loaded and executed by the processor to perform the method for constructing a simulated vehicle lane change trajectory provided by the foregoing method embodiments.

The memory may be used to store a software program and module. The processor runs the software program and module stored in the memory, to implement various functional applications and data processing. The memory may mainly include a program storage area and a data storage area. The program storage area may store an operating system, an application required by a function, and the like. The data storage area may store data created according to use of the device, and the like. In addition, the memory may include a high-speed random access memory, and may also include a non-volatile memory, such as at least one magnetic disk storage device, a flash memory, or another volatile solid-state storage device. Correspondingly, the memory may further include a memory controller, so as to provide access of the processor to the memory.

Figure 10:
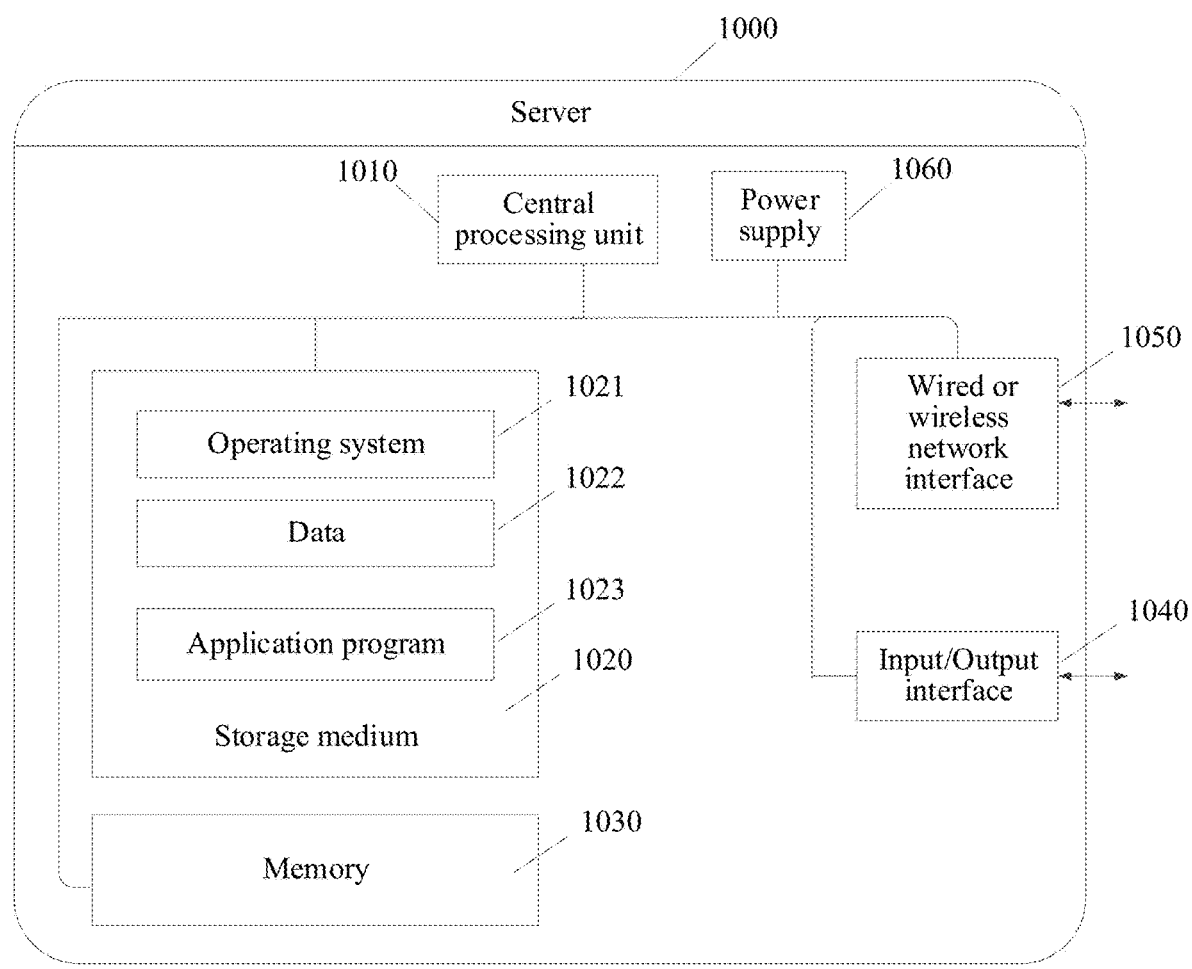
FIG. 10 is a block diagram of a hardware structure of a server of a method for constructing a simulated vehicle lane change trajectory according to an embodiment of this disclosure.

The method embodiment provided in the embodiments of this application may be executed in a mobile terminal, a computer terminal, a server, or a similar computing apparatus. By using an example of being run on a server, FIG. 10 is a structural block diagram of a hardware of a server of a method for constructing a simulated vehicle lane change trajectory according to an embodiment of this disclosure. As shown in FIG. 10, a server 1000 may vary greatly due to different configurations or performance, and may include one or more central processing units (CPUs) 1010 (the CPUs 1010 may include but are not limited to processing apparatuses such as microprocessors MCU or programmable logical devices FPGA), and a memory 1030 configured to store data, and one or more storage media 1020 (for example, one or more mass storage devices) storing an application 1023 or data 1022. The memory 1030 and the storage media 1020 may be transient storage or persistent storage. Programs stored in the storage media 1020 may include one or more modules, and each module may include series of instructions to the server. Furthermore, the CPUs 1010 may be configured to be in communication with the storage media 1020 and to execute the series of instructions in the storage media 1020 on the server 1000. The server 1000 may further include one or more power supplies 1060, one or more wired or wireless network interfaces 1050, one or more input/output interfaces 1040, and/or one or more operating systems 1021, such as Windows Server™, Mac OS X™, Unix™, Linux™, and FreeBSD™.

An input/output interface 1040 may receive or transmit data through a network. A specific example of the foregoing network may include a wireless network provided by a communications provider of the server 1000. In an example, the input/output interface 1040 includes a network interface controller (NIC), which may be connected to another network device through a base station so as to communicate with the Internet. In an example, the input/output interface 1040 may be a radio frequency (RF) module, which is configured to communicate with the Internet in a wireless manner.

A person of ordinary skill in the art may understand that the structure shown in FIG. 10 is only for the purpose of illustration, and does not cause a limitation to the structure of the foregoing electronic device. For example, the server 1000 may alternatively include more or fewer components than those shown in FIG. 10, or have a configuration different from that shown in FIG. 10.

The embodiments of this application further provide a non-transitory storage medium, the non-transitory storage medium may be configured to store at least one instruction, at least one program, a code set, or an instruction set which are related to the method for constructing a simulated vehicle lane change trajectory, and the at least one instruction, the at least one program, the code set, or the instruction set are loaded and executed by a processor to perform the method for constructing a simulated vehicle lane change trajectory provided by the foregoing method embodiments.

In this embodiment, the foregoing non-transitory storage medium may be located in at least one of multiple network servers in a computer network. In this embodiment, the non-transitory storage medium may include, but is not limited to, a medium such as a USB flash drive, a read-only memory (ROM), a random access memory (RAM), a removable hard disk, a magnetic disk, or an optical disc that can store the program code.

It may be seen from the method and apparatus for constructing a simulated vehicle lane change trajectory, and the server or the non-transitory storage medium provided in this application that, in this application, a lane change trajectory coordinate system is constructed, then, a traveling status in a lane change process is represented by transverse traveling data and longitudinal traveling data respectively, for different statuses encountered in the lane change process, different lane change trajectories are constructed with reference to the transverse traveling data and the longitudinal traveling data, and an original lane return trajectory is constructed when a lane change cannot be completed at a time because a following vehicle located behind the present vehicle in the target lane accelerates instead of yielding. In this way, a simulated trajectory can reflect the reality better, and can provide effective decision-making support for practical application of automatic driving.

The sequence of the foregoing embodiments of this application are merely for description purpose but do not represent the preference among the embodiments. Specific embodiments of this specification are described above. Other embodiments fall within the scope of the appended claims. In some cases, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The embodiments of this specification are all described in a progressive manner, for same or similar parts in the embodiments, refer to such embodiments, and descriptions of each embodiment focus on a difference from other embodiments. Especially, apparatus and server embodiments are basically similar to a method embodiment, and therefore are described briefly; and, for related parts, reference may be made to partial descriptions in the method embodiment.

A person of ordinary skill in the art may understand that all or some of the steps of the foregoing embodiments may be implemented by hardware, or may be implemented by a program instructing related hardware. The program may be stored in a non-transitory computer-readable storage medium. The non-transitory storage medium mentioned above may be: a ROM, a magnetic disk, or an optical disc.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for constructing a simulated vehicle lane change trajectory, executed by a device associated with a lane change vehicle, a lane change trajectory coordinate system being constructed by using a position of the lane change vehicle as an origin, a center line of an initial lane of the lane change vehicle along a traveling direction as an ordinate axis, and a normal direction of the center line as an abscissa axis direction, the method comprising:
   determining a target preceding vehicle according to the position of the lane change vehicle;
   determining target longitudinal traveling data of the lane change vehicle in a lane change process according to a longitudinal speed of the lane change vehicle, a longitudinal speed of the preceding vehicle, and a distance between the preceding vehicle and the lane change vehicle at each moment in the lane change process, wherein the lane change process is a process to change from an initial lane to a target lane;
   determining target transverse traveling data of the lane change vehicle in the lane change process according to preset initial transverse traveling data, preset end transverse traveling data, and a preset lane change time in the lane change process, by using a high-order polynomial, wherein the preset initial transverse traveling data comprises an initial position, an initial speed, and an initial acceleration, the preset end transverse traveling data comprises an end position, an end speed, and an end acceleration, and wherein the high-order polynomial uses the preset initial transverse traveling data and the preset end transverse traveling data as inputs;
   constructing, in response to a preset lane change condition being met, or in response to the preset lane change condition being not met, determining that the lane change vehicle continues to change lanes, and a following vehicle in the target lane decelerating, a first lane change trajectory of the lane change vehicle in the lane change trajectory coordinate system based on the target transverse traveling data and the target longitudinal traveling data;
   updating, in response to the preset lane change condition being not met, determining that the lane change vehicle continues to change lanes, and the following vehicle not decelerating, an acceleration in the target longitudinal traveling data, to cause an updated longitudinal speed to be greater than a longitudinal speed of the following vehicle and less than a longitudinal speed of the preceding vehicle in the target lane, and constructing a second lane change trajectory of the lane change vehicle in the lane change trajectory coordinate system based on the updated longitudinal traveling data and the target transverse traveling data;
   updating, in response to the preset lane change condition being not met, and it is determined that the lane change vehicle does not continue to change lanes, transverse traveling data and longitudinal traveling data in a return process to return to the initial lane, and constructing a first initial lane return trajectory of the lane change vehicle in the lane change trajectory coordinate system according to the transverse traveling data and the longitudinal traveling data in the return process; and
   controlling, based on one of: the first lane change trajectory, the second lane change trajectory, or the first initial lane return trajectory, the lane change vehicle.

2. The method according to claim 1, wherein determining the target preceding vehicle according to the position of the lane change vehicle comprises:
   determining the target preceding vehicle from a preceding vehicle in the target lane and a preceding vehicle in the initial lane depending on whether a center of mass of the lane change vehicle crosses a lane line of the initial lane.

3. The method according to claim 1, wherein updating the transverse traveling data and the longitudinal traveling data in the return process comprises:
   using a moment at which the preset lane change condition is not met as an initial moment of returning to the initial lane, and determining initial transverse traveling data corresponding to the initial moment;
   determining end transverse traveling data corresponding to an end moment of the return process;

determining the transverse traveling data in the return process according to the initial transverse traveling data, the end transverse traveling data, and a first preset return time;

continuously updating the target preceding vehicle from the initial moment to the end moment, by selecting from a preceding vehicle in the target lane and a preceding vehicle in the initial lane, depending on whether a center of mass of the lane change vehicle crosses a lane line of the initial lane; and determining the longitudinal traveling data in the return process according to a longitudinal speed of the lane change vehicle, a longitudinal speed of the target preceding vehicle, and a distance between the target preceding vehicle and the lane change vehicle.

4. The method according to claim 1, wherein in response to the preset lane change condition being not met, the method further comprises:

using a moment at which the preset lane change condition is not met as an initial moment of straightening a front of the lane change vehicle, and determining initial transverse traveling data at the initial moment;

determining end transverse traveling data at an end moment of the straightening the front of the lane change vehicle;

determining transverse traveling data in a process of straightening the front of the lane change vehicle according to: the initial transverse traveling data, the end transverse traveling data, and a preset straightening time;

continuously updating the target preceding vehicle from the initial moment to the end moment, by selecting from a preceding vehicle in the target lane and a preceding vehicle in the initial lane, depending on whether a center of mass of the lane change vehicle crosses a lane line of the initial lane;

determining longitudinal traveling data in a process of straightening the front of the lane change vehicle according to: a longitudinal speed of the lane change vehicle, a longitudinal speed of the target preceding vehicle, and a distance between the target preceding vehicle and the lane change vehicle; and constructing a vehicle front straightening trajectory of the lane change vehicle in the lane change trajectory coordinate system based on the transverse traveling data and the longitudinal traveling data in the process of the straightening a vehicle front.

5. The method according to claim 4, further comprising:
using a process in which the lane change vehicle continues traveling longitudinally from a transverse position at the end moment of straightening the front of the lane change vehicle as a straight-line riding process;

using a moment at which the following vehicle decelerates in the straight-line riding process as an initial moment of continuing to change lanes;

determining initial transverse traveling data at the initial moment of the continuing to change lanes;

determining end transverse traveling data at an end moment of the continuing to change lanes;

determining transverse traveling data in a process of the continuing to change lanes according to: the initial transverse traveling data at the initial moment of continuing to change lanes, the end transverse traveling data at the end moment of continuing to change lanes, and a preset time of continuing to change lanes;

continuously updating the target preceding vehicle from the initial moment of continuing to change lanes to the end moment of continuing to change lanes, by selecting from a preceding vehicle in the target lane and a preceding vehicle in the initial lane, depending on whether the center of mass of the lane change vehicle crosses the lane line of the initial lane;

determining longitudinal traveling data in the process of the continuing to change lanes according to: a longitudinal speed of the lane change vehicle, a longitudinal speed of the target preceding vehicle, and a distance between the target preceding vehicle and the lane change vehicle; and constructing a third lane change trajectory of the lane change vehicle in the lane change trajectory coordinate system based on the transverse traveling data and the longitudinal traveling data in the process of the continuing to change lanes.

6. The method according to claim 5, further comprising:
in response to a duration in the straight-line riding process being greater than or equal to a preset riding time and the following vehicle not decelerating, using a moment after riding for the preset riding time as an initial moment of returning to the initial lane;

determining initial transverse traveling data at the initial moment of the returning to the initial lane;

determining end transverse traveling data at an end moment of the returning to the initial lane;

determining the transverse traveling data in the return process according to the initial transverse traveling data at the initial moment of the returning to the initial lane, the end transverse traveling data at the end moment of the returning to the initial lane, and a second preset return time;

continuously updating the target preceding vehicle from the initial moment of returning to the initial lane to the end moment of returning to the initial lane, by selecting from a preceding vehicle in the target lane and a preceding vehicle in the initial lane, depending on whether the center of mass of the lane change vehicle crosses the lane line of the initial lane;

determining the longitudinal traveling data in the return process according to a longitudinal speed of the lane change vehicle, a longitudinal speed of the target preceding vehicle, and a distance between the target preceding vehicle and the lane change vehicle; and constructing a second initial lane return trajectory of the lane change vehicle in the lane change trajectory coordinate system based on the transverse traveling data and the longitudinal traveling data in the return process.

7. The method according to claim 6, further comprising:
setting a proportion of lane change scenario corresponding to the first lane change trajectory, the second lane change trajectory, the first initial lane return trajectory, and the second initial lane return trajectory; and constructing a lane change scenario of the lane change vehicle based on the proportion.

8. The method according to claim 4, further comprising:
determining a riding time for continuing traveling longitudinally from a transverse position according to the transverse traveling data at the end moment of the straightening the front of the lane change vehicle; and constructing a riding trajectory of the lane change vehicle in the lane change trajectory coordinate system based on the riding time, the transverse traveling data at the end moment of the straightening the front of the lane change vehicle, and the longitudinal traveling data at the end moment of the straightening the front of the lane change vehicle.

9. The method according to claim 1, wherein in response to the preset lane change condition being not met, determining that the lane change vehicle continues to change lanes, and the following vehicle not decelerating, the method further comprises recording a collision accident.

10. A device associated with a lane change vehicle for constructing a simulated vehicle lane change trajectory, wherein a lane change trajectory coordinate system is constructed by using a position of the lane change vehicle as an origin, a center line of an initial lane of the lane change vehicle along a traveling direction as an ordinate axis, and a normal direction of the center line as an abscissa axis direction, the device comprising a memory for storing computer instructions and a processor in communication with the memory, wherein, when the processor executes the computer instructions, the processor is configured to cause the device to:
- determine a target preceding vehicle according to the position of the lane change vehicle;
- determine target longitudinal traveling data of the lane change vehicle in a lane change process according to a longitudinal speed of the lane change vehicle, a longitudinal speed of the preceding vehicle, and a distance between the preceding vehicle and the lane change vehicle at each moment in the lane change process, wherein the lane change process is a process to change from an initial lane to a target lane;
- determine target transverse traveling data of the lane change vehicle in the lane change process according to preset initial transverse traveling data, preset end transverse traveling data, and a preset lane change time in the lane change process, by using a high-order polynomial, wherein the preset initial transverse traveling data comprises an initial position, an initial speed, and an initial acceleration, the preset end transverse traveling data comprises an end position, an end speed, and an end acceleration, and wherein the high-order polynomial uses the preset initial transverse traveling data and the preset end transverse traveling data as inputs;
- construct, in response to a preset lane change condition being met, or in response to the preset lane change condition being not met, determining that the lane change vehicle continues to change lanes, and a following vehicle in the target lane decelerating, a first lane change trajectory of the lane change vehicle in the lane change trajectory coordinate system based on the target transverse traveling data and the target longitudinal traveling data;
- update, in response to the preset lane change condition being not met, determining that the lane change vehicle continues to change lanes, and the following vehicle not decelerating, an acceleration in the target longitudinal traveling data, to cause an updated longitudinal speed to be greater than a longitudinal speed of the following vehicle and less than a longitudinal speed of the preceding vehicle in the target lane, and constructing a second lane change trajectory of the lane change vehicle in the lane change trajectory coordinate system based on the updated longitudinal traveling data and the target transverse traveling data;
- update, in response to the preset lane change condition being not met, and it is determined that the lane change vehicle does not continue to change lanes, transverse traveling data and longitudinal traveling data in a return process to return to the initial lane, and construct a first initial lane return trajectory of the lane change vehicle in the lane change trajectory coordinate system according to the transverse traveling data and the longitudinal traveling data in the return process; and
- control, based on one of: the first lane change trajectory, the second lane change trajectory, or the first initial lane return trajectory, the lane change vehicle.

11. The device according to claim 10, wherein, when the processor is configured to cause the device to determine the target preceding vehicle according to the position of the lane change vehicle, the processor is configured to cause the device to:
- determine the target preceding vehicle from a preceding vehicle in the target lane and a preceding vehicle in the initial lane depending on whether a center of mass of the lane change vehicle crosses a lane line of the initial lane.

12. The device according to claim 10, wherein, when the processor is configured to cause the device to update the transverse traveling data and the longitudinal traveling data in the return process, the processor is configured to cause the device to:
- use a moment at which the preset lane change condition is not met as an initial moment of returning to the initial lane, and determining initial transverse traveling data corresponding to the initial moment;
- determine end transverse traveling data corresponding to an end moment of the return process;
- determine the transverse traveling data in the return process according to the initial transverse traveling data, the end transverse traveling data, and a first preset return time;
- continuously update the target preceding vehicle from the initial moment to the end moment, by selecting from a preceding vehicle in the target lane and a preceding vehicle in the initial lane, depending on whether a center of mass of the lane change vehicle crosses a lane line of the initial lane; and
- determine the longitudinal traveling data in the return process according to a longitudinal speed of the lane change vehicle, a longitudinal speed of the target preceding vehicle, and a distance between the target preceding vehicle and the lane change vehicle.

13. The device according to claim 10, wherein, in response to the preset lane change condition being not met, the processor is configured to further cause the device to:
- use a moment at which the preset lane change condition is not met as an initial moment of straightening a front of the lane change vehicle, and determine initial transverse traveling data at the initial moment;
- determine end transverse traveling data at an end moment of the straightening the front of the lane change vehicle;
- determine transverse traveling data in a process of straightening the front of the lane change vehicle according to: the initial transverse traveling data, the end transverse traveling data, and a preset straightening time;
- continuously update the target preceding vehicle from the initial moment to the end moment, by selecting from a preceding vehicle in the target lane and a preceding vehicle in the initial lane, depending on whether a center of mass of the lane change vehicle crosses a lane line of the initial lane;
- determine longitudinal traveling data in a process of straightening the front of the lane change vehicle according to: a longitudinal speed of the lane change vehicle, a longitudinal speed of the target preceding vehicle, and a distance between the target preceding vehicle and the lane change vehicle; and construct a vehicle front straightening trajectory of the lane change vehicle in the lane change trajectory coordinate system based on the transverse traveling data and the longitudinal traveling data in the process of the straightening a vehicle front.

14. The device according to claim 13, wherein, when the processor executes the computer instructions, the processor is configured to further cause the device to:
use a process in which the lane change vehicle continues traveling longitudinally from a transverse position at the end moment of straightening the front of the lane change vehicle as a straight-line riding process;
use a moment at which the following vehicle decelerates in the straight-line riding process as an initial moment of continuing to change lanes;
determine initial transverse traveling data at the initial moment of the continuing to change lanes;
determine end transverse traveling data at an end moment of the continuing to change lanes;
determining transverse traveling data in a process of the continuing to change lanes according to: the initial transverse traveling data at the initial moment of continuing to change lanes, the end transverse traveling data at the end moment of continuing to change lanes, and a preset time of continuing to change lanes;
continuously update the target preceding vehicle from the initial moment of continuing to change lanes to the end moment of continuing to change lanes, by selecting from a preceding vehicle in the target lane and a preceding vehicle in the initial lane, depending on whether the center of mass of the lane change vehicle crosses the lane line of the initial lane;
determine longitudinal traveling data in the process of the continuing to change lanes according to: a longitudinal speed of the lane change vehicle, a longitudinal speed of the target preceding vehicle, and a distance between the target preceding vehicle and the lane change vehicle; and
construct a third lane change trajectory of the lane change vehicle in the lane change trajectory coordinate system based on the transverse traveling data and the longitudinal traveling data in the process of the continuing to change lanes.

15. The device according to claim 14, wherein, when the processor executes the computer instructions, the processor is configured to further cause the device to:
in response to a duration in the straight-line riding process being greater than or equal to a preset riding time and the following vehicle not decelerating, use a moment after riding for the preset riding time as an initial moment of returning to the initial lane;
determine initial transverse traveling data at the initial moment of the returning to the initial lane;
determine end transverse traveling data at an end moment of the returning to the initial lane;
determine the transverse traveling data in the return process according to the initial transverse traveling data at the initial moment of the returning to the initial lane, the end transverse traveling data at the end moment of the returning to the initial lane, and a second preset return time;
continuously update the target preceding vehicle from the initial moment of returning to the initial lane to the end moment of returning to the initial lane, by selecting from a preceding vehicle in the target lane and a preceding vehicle in the initial lane, depending on whether the center of mass of the lane change vehicle crosses the lane line of the initial lane;
determine the longitudinal traveling data in the return process according to a longitudinal speed of the lane change vehicle, a longitudinal speed of the target preceding vehicle, and a distance between the target preceding vehicle and the lane change vehicle; and
construct a second initial lane return trajectory of the lane change vehicle in the lane change trajectory coordinate system based on the transverse traveling data and the longitudinal traveling data in the return process.

16. The device according to claim 15, wherein, when the processor executes the computer instructions, the processor is configured to further cause the device to:
set a proportion of lane change scenario corresponding to the first lane change trajectory, the second lane change trajectory, the first initial lane return trajectory, and the second initial lane return trajectory; and
construct a lane change scenario of the lane change vehicle based on the proportion.

17. The device according to claim 13, wherein, when the processor executes the computer instructions, the processor is configured to further cause the device to:
determine a riding time for continuing traveling longitudinally from a transverse position according to the transverse traveling data at the end moment of the straightening the front of the lane change vehicle; and
construct a riding trajectory of the lane change vehicle in the lane change trajectory coordinate system based on the riding time, the transverse traveling data at the end moment of the straightening the front of the lane change vehicle, and the longitudinal traveling data at the end moment of the straightening the front of the lane change vehicle.

18. The device according to claim 10, wherein in response to the preset lane change condition being not met, determining that the lane change vehicle continues to change lanes, and the following vehicle not decelerating, the processor is configured to further cause the device to record a collision accident.

19. A non-transitory storage medium for storing computer readable instructions, wherein a lane change trajectory coordinate system is constructed by using a position of a lane change vehicle as an origin, a center line of an initial lane of the lane change vehicle along a traveling direction as an ordinate axis, and a normal direction of the center line as an abscissa axis direction, the computer readable instructions, when executed by a processor in a device, causing the processor to:
determine a target preceding vehicle according to the position of the lane change vehicle;
determine target longitudinal traveling data of the lane change vehicle in a lane change process according to a longitudinal speed of the lane change vehicle, a longitudinal speed of the preceding vehicle, and a distance between the preceding vehicle and the lane change vehicle at each moment in the lane change process, wherein the lane change process is a process to change from an initial lane to a target lane;
determine target transverse traveling data of the lane change vehicle in the lane change process according to preset initial transverse traveling data, preset end transverse traveling data, and a preset lane change time in the lane change process, by using a high-order polynomial, wherein the preset initial transverse traveling data comprises an initial position, an initial speed, and an initial acceleration, the preset end transverse traveling data comprises an end position, an end speed, and an end acceleration, and wherein the high-order polynomial uses the preset initial transverse traveling data and the preset end transverse traveling data as inputs;

construct, in response to a preset lane change condition being met, or in response to the preset lane change condition being not met, determining that the lane change vehicle continues to change lanes, and a following vehicle in the target lane decelerating, a first lane change trajectory of the lane change vehicle in the lane change trajectory coordinate system based on the target transverse traveling data and the target longitudinal traveling data;

update, in response to the preset lane change condition being not met, determining that the lane change vehicle continues to change lanes, and the following vehicle not decelerating, an acceleration in the target longitudinal traveling data, to cause an updated longitudinal speed to be greater than a longitudinal speed of the following vehicle and less than a longitudinal speed of the preceding vehicle in the target lane, and constructing a second lane change trajectory of the lane change vehicle in the lane change trajectory coordinate system based on the updated longitudinal traveling data and the target transverse traveling data;

update, in response to the preset lane change condition being not met, and it is determined that the lane change vehicle does not continue to change lanes, transverse traveling data and longitudinal traveling data in a return process to return to the initial lane, and construct a first initial lane return trajectory of the lane change vehicle in the lane change trajectory coordinate system according to the transverse traveling data and the longitudinal traveling data in the return process; and control, based on one of: the first lane change trajectory, the second lane change trajectory, or the first initial lane return trajectory, the lane change vehicle.

20. The non-transitory storage medium according to claim 19, wherein, when the computer readable instructions cause the processor to determine the target preceding vehicle according to the position of the lane change vehicle the computer readable instructions cause the processor to:

determine the target preceding vehicle from a preceding vehicle in the target lane and a preceding vehicle in the initial lane depending on whether a center of mass of the lane change vehicle crosses a lane line of the initial lane.

* * * * *